US012800412B2

(12) United States Patent
Watanabe

(10) Patent No.: US 12,800,412 B2
(45) Date of Patent: Nov. 17, 2026

(54) PRESSURE SENSITIVE SENSOR UNIT INCLUDING FIRST AND SECOND LOAD TRANSMITTING MEMBERS

(71) Applicant: Fujikura Ltd., Tokyo (JP)

(72) Inventor: Masami Watanabe, Chiba (JP)

(73) Assignee: Fujikura Ltd., Tokyo (JP)

( * ) Notice: Subject to any disclaimer, the term of this patent is extended or adjusted under 35 U.S.C. 154(b) by 259 days.

(21) Appl. No.: 18/729,048

(22) PCT Filed: Dec. 15, 2022

(86) PCT No.: PCT/JP2022/046268
§ 371 (c)(1),
(2) Date: Jul. 15, 2024

(87) PCT Pub. No.: WO2023/136041
PCT Pub. Date: Jul. 20, 2023

(65) Prior Publication Data
US 2025/0102377 A1 Mar. 27, 2025

(30) Foreign Application Priority Data
Jan. 17, 2022 (JP) ................................ 2022-005182

(51) Int. Cl.
*G01L 1/22* (2006.01)

(52) U.S. Cl.
CPC ..................................... *G01L 1/22* (2013.01)

(58) Field of Classification Search
CPC . G01L 1/22; G01L 9/0072; G01L 1/14; G01L 1/146; G01L 1/04; G01G 3/12;
(Continued)

(56) References Cited

U.S. PATENT DOCUMENTS 6,829,942 B2 12/2004 Yanai et al.
2012/0272751 A1 11/2012 Gorjanc et al.
2020/0124486 A1* 4/2020 Inamori .................. G01L 1/225

FOREIGN PATENT DOCUMENTS

CN 109690272 B 10/2020
JP H10-214537 A 8/1998
(Continued)

OTHER PUBLICATIONS

International Search Report issued in corresponding International Application No. PCT/JP2022/046268, dated Feb. 21, 2023, with translation (5 pages).

*Primary Examiner* — Brandi N Hopkins
(74) *Attorney, Agent, or Firm* — Osha Bergman Watanabe & Burton LLP

(57) ABSTRACT

A pressure sensitive sensor unit includes: a first pressure sensitive sensor with a first output that changes according to a magnitude of an applied load; a second pressure sensitive sensor with a second output that changes according to the magnitude of the applied load; a plate member arranged so as to include the first and second pressure sensitive sensors in a plan view; a first load transmitting member interposed between the first pressure sensitive sensor and the plate member; and a second load transmitting member interposed between the second pressure sensitive sensor and the plate member. The first load transmitting member transmits a load belonging to a first load range to the first pressure sensitive sensor. The second load transmitting member transmits a load belonging to a second load range to the second pressure sensitive sensor. The second load range is larger than the first load range.

14 Claims, 8 Drawing Sheets

(58) Field of Classification Search
CPC ...... G06F 3/044; G06F 3/0447; G06F 1/1626; G06F 3/0338; G06F 3/0414; B60N 2/0032; B60N 2/7094; H01H 11/00; H01H 1/06; H04R 19/01; G01D 5/24; H10N 30/302; B60H 1/22; B60H 1/32; B60H 1/00
See application file for complete search history.

(56) References Cited

FOREIGN PATENT DOCUMENTS

| | | | | | | |
|---|---|---|---|---|---|---|
| JP | H11-273503 | A | | 10/1999 | | |
| JP | 2002158103 | A | | 5/2002 | | |
| JP | 2007163322 | A | | 6/2007 | | |
| JP | 2008256399 | A | | 10/2008 | | |
| JP | 2012204127 | A | | 10/2012 | | |
| JP | 2014-534451 | A | | 12/2014 | | |
| JP | 2015088331 | A | | 5/2015 | | |
| JP | 5782582 | B1 | | 9/2015 | | |
| JP | 2016-003991 | A | | 1/2016 | | |
| JP | 2017-138224 | A | | 8/2017 | | |
| JP | 2020-034425 | A | | 3/2020 | | |
| KR | 20110124964 | A | * | 11/2011 | ............. | A43B 17/04 |
| TW | 202020415 | A | | 6/2020 | | |
| WO | 2013146995 | A1 | | 10/2013 | | |

* cited by examiner

PRESSURE SENSITIVE SENSOR UNIT INCLUDING FIRST AND SECOND LOAD TRANSMITTING MEMBERS

CROSS-REFERENCE TO RELATED APPLICATIONS

The present application is a national stage application of PCT Application No. PCT/JP2022/046268, filed on Dec. 15, 2022, which claims priority to Japanese Patent Application No. 2022-005182, filed on Jan. 17, 2022. The contents of these documents are incorporated by reference in their entirety.

TECHNICAL FIELD

The present invention relates to a pressure sensitive sensor unit including a pressure sensitive sensor that detects the magnitude of an applied load.

BACKGROUND

A known pressure sensitive sensor includes an upper circuit board having a pair of interdigitated comb-shaped electrodes and a lower circuit board having a disk-shaped electrode facing the comb-shaped electrodes. In this pressure sensitive sensor, at least one of the three electrodes described above is a pressure sensitive resistive body (see, for example, Patent Document 1 (paragraphs to and FIGS. 1(*a*) to 1(*c*))). In addition, another known pressure sensitive sensor includes an upper circuit board having a disk-shaped pressure sensitive resistive body and a lower circuit board having a disk-shaped counter electrode facing the pressure sensitive resistive body (see, for example, Patent Document 1 (paragraphs to and FIGS. 2(*a*) to 2(*c*))).

In the pressure sensitive sensors described above, when a load is applied from above to the upper circuit board, the electrodes arranged below the portion to which the load is applied come into direct contact with each other. Then, as the load increases further, the contact area between the electrodes increases and the resistance value decreases. The pressure sensitive sensors described above detect the magnitude of the load by using such a change in resistance value.

CITATION LIST

Patent Document

Patent Document 1: JP 2002-158103 A

Known pressure sensitive sensors such as those described above may have a narrow range of a load that can be detected.

SUMMARY

One or more embodiments of the invention provide a pressure sensitive sensor unit capable of detecting a wide range of loads.

[1] According to one or more embodiments of the invention, a pressure sensitive sensor unit includes: a first pressure sensitive sensor whose output changes according to a magnitude of an applied load; a second pressure sensitive sensor whose output changes according to a magnitude of an applied load; a plate member arranged so as to include the first and second pressure sensitive sensors in plan view; a first load transmitting member interposed between the first pressure sensitive sensor and the plate member; and a second load transmitting member interposed between the second pressure sensitive sensor and the plate member. The first load transmitting member transmits a load belonging to a first load range to the first pressure sensitive sensor. The second load transmitting member transmits a load belonging to a second load range larger than the first load range to the second pressure sensitive sensor.

[2] According to one or more embodiments of the invention, in the pressure sensitive sensor unit according to the first aspect, the second load transmitting member may not transmit a load belonging to the first load range to the second pressure sensitive sensor.

[3] According to one or more embodiments of the invention, in the pressure sensitive sensor unit according to the first or second aspect, a height of the first load transmitting member may be higher than a height of the second load transmitting member, or the second load transmitting member may be softer than the first load transmitting member.

[4] According to one or more embodiments of the invention, in the pressure sensitive sensor unit according to any one of the first to third aspects, the first pressure sensitive sensor may include first and second electrodes electrically connected to each other by application of a load, the second pressure sensitive sensor may include third and fourth electrodes electrically connected to each other by application of a load, and the pressure sensitive sensor unit may include a resistive body electrically connected in series to the first or second electrode of the first pressure sensitive sensor.

[5] According to one or more embodiments of the invention, in the pressure sensitive sensor unit according to the fourth aspect, a resistance value of the resistive body may be larger than a resistance value in an ON state of the second pressure sensitive sensor.

[6] According to one or more embodiments of the invention, in the pressure sensitive sensor unit according to the fourth or fifth aspect, the pressure sensitive sensor unit may include a plurality of the first pressure sensitive sensors. The pressure sensitive sensor unit may include: a first electrode group including a plurality of the first electrodes electrically connected to each other; and a second electrode group including a plurality of the second electrodes electrically connected to each other. The resistive body may be electrically connected in series to the first or second electrode group.

[7] According to one or more embodiments of the invention, in the pressure sensitive sensor unit according to any one of the fourth to sixth aspects, the pressure sensitive sensor unit may include: a first base material; and a second base material facing the first base material. The first electrode may be provided on the first base material, and the second electrode may be provided on the first base material so as to face a first connection body provided on the second base material so as to face the first electrode or be provided on the second base material so as to face the first electrode.

[8] According to one or more embodiments of the invention, in the pressure sensitive sensor unit according to any one of aspects 4 to 6, the pressure sensitive sensor unit may include: a first base material; and a second base material facing the first base material. The third electrode may be provided on the first base material, and the fourth electrode may be provided on the first base material so as to face a second connection body provided on the second base material so as to face the third electrode or be provided on the second base material so as to face the third electrode.

[9] According to one or more embodiments of the invention, in the pressure sensitive sensor unit according to the seventh or eighth aspect, a height of the first load transmitting member may be higher than a height of the second load transmitting member, the first load transmitting member may be bonded to one of the first and second base materials and bonded to the plate member, and the second load transmitting member may be bonded to only one of the first base material, the second base material, and the plate member.

[10] According to one or more embodiments of the invention, in the pressure sensitive sensor unit according to any one of the seventh to ninth aspects, the pressure sensitive sensor unit may include a spacer interposed between the first base material and the second base material. The spacer may include: a first opening in which the first and second electrodes of the first pressure sensitive sensor are housed; and a second opening in which the third and fourth electrodes of the second pressure sensitive sensor are housed. A width of the first opening may be larger than a width of the second opening.

[11] According to one or more embodiments of the invention, in the pressure sensitive sensor unit according to any one of the first to tenth aspects, the pressure sensitive sensor unit may include: a plurality of the first pressure sensitive sensors; and a plurality of the first load transmitting members. The plurality of first pressure sensitive sensors may be arranged around the second pressure sensitive sensor, and the plurality of first load transmitting members may be arranged around the second load transmitting member.

The pressure sensitive sensor unit according to one or more embodiments the invention includes the first load transmitting member that transmits a load belonging to the first load range to the first pressure sensitive sensor and the second load transmitting member that transmits a load belonging to the second load range larger than the first load range to the second pressure sensitive sensor. Therefore, since the pressure sensitive sensor unit according one or more embodiments to the invention can detect a load in both the first range and the second range, it is possible to increase the detectable load range.

DETAILED DESCRIPTION

Hereinafter, embodiments of the invention will be described with reference to the diagrams.

Figure 1:
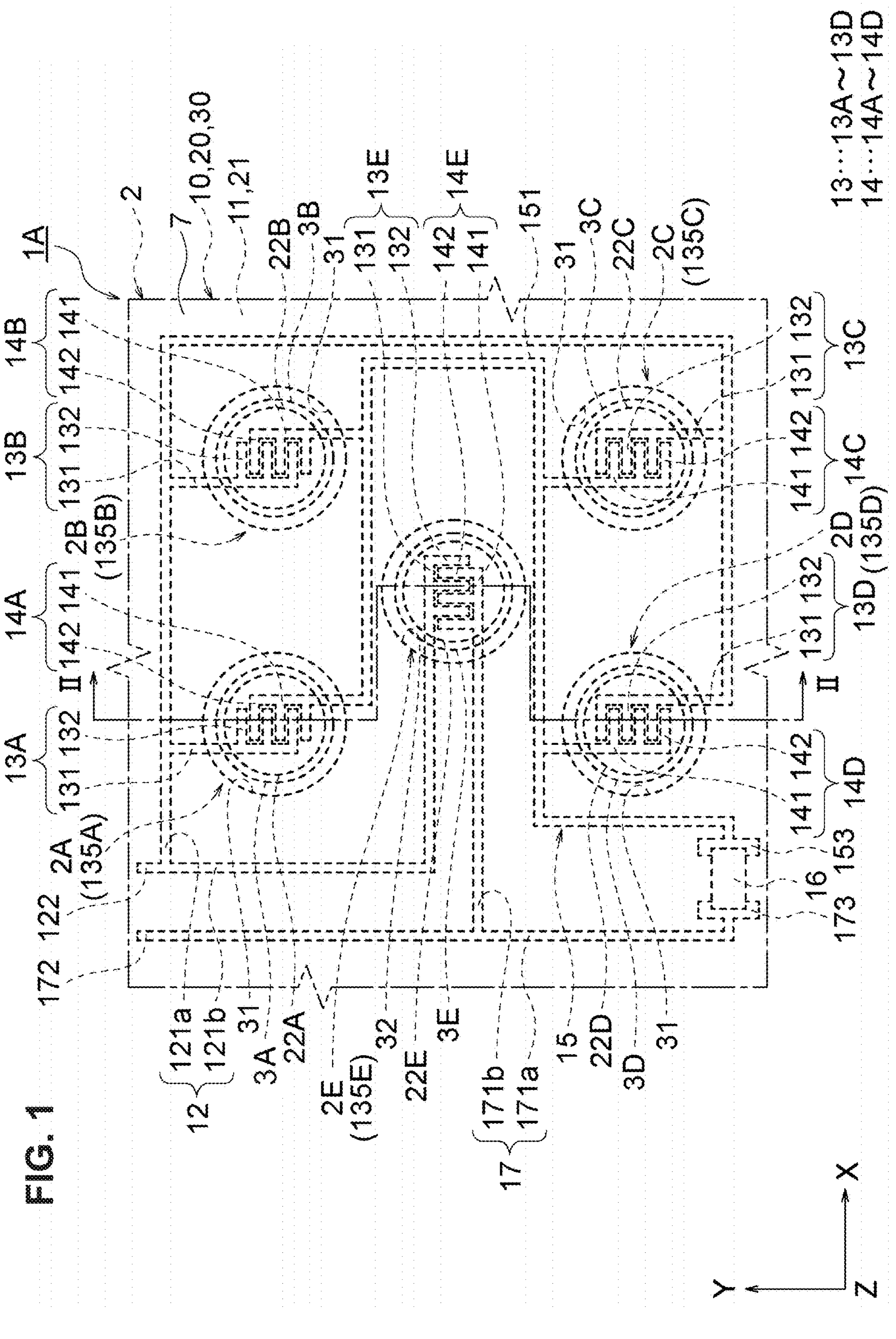
FIG. 1 is a plan view showing an example of a pressure sensitive sensor unit according to one or more embodiments of the invention.
Figure 2:
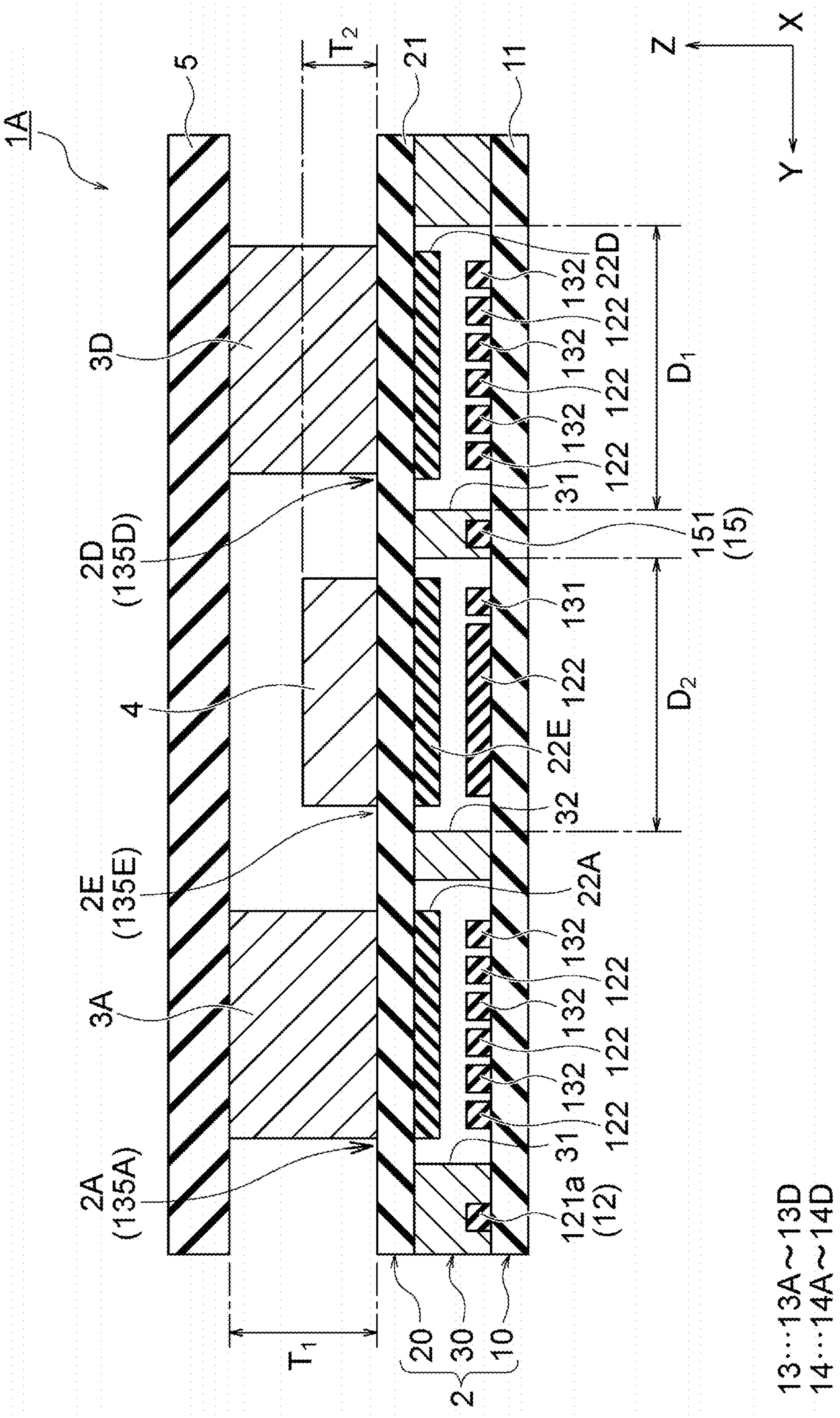
FIG. 2 is a cross-sectional view taken along the line II-II of FIG. 1.

FIG. 1 is a plan view showing an example of a pressure sensitive sensor unit according to one or more embodiments of the invention. FIG. 2 is a cross-sectional view taken along the line II-II of FIG. 1. In addition, FIG. 2 shows a pressure sensitive sensor unit in an unloaded state in which no load is applied.

A pressure sensitive sensor unit 1A is a pressure sensitive sensor unit whose output changes according to the magnitude of the applied load. In one or more embodiments, a resistance value is used as this output. In addition, this output is not limited to the resistance value, but may be, for example, a voltage value.

As shown in FIGS. 1 and 2, the pressure sensitive sensor unit 1A according to one or more embodiments includes a pressure sensitive sensor sheet 2, a plurality of (four in this example) first load transmitting members 3A to 3D, a second load transmitting member 4, and a plate member 5.

The pressure sensitive sensor sheet 2 includes pressure sensitive sensors 2A to 2E whose resistance values change according to the magnitude of the applied load. In one or more embodiments, the first pressure sensitive sensors 2A to 2D are used to detect a load (low load) belonging to a first load range (low load range), and the second pressure sensitive sensor 2E is used to detect a load (high load) belonging to a second load range (high load range) larger than the first load range.

Here, the load range refers to a range of the magnitude of the load. The first load range is not particularly limited, but may be, for example, 20 gf to 500 gf, and the second load range is not particularly limited, but may be, for example, 500 gf to 2000 gf.

As shown in FIGS. 1 and 2, the pressure sensitive sensor sheet 2 according to one or more embodiments includes a lower membrane substrate 10, an upper membrane substrate 20, and a spacer 30.

As shown in FIGS. 1 and 2, the lower membrane substrate 10 has a first base material 11, a first wiring pattern 12, a first electrode group 13 (13A to 13D), a second electrode group 14 (14A to 14D), a third electrode 13E, a fourth electrode 14E, a second wiring pattern 15, a resistive body 16, and a third wiring pattern 17.

The first base material 11 of the lower membrane substrate 10 is a film-like member formed of a flexible and electrically insulating material. Examples of the material that makes up the first base material 11 include resin materials. More specifically, polyethylene terephthalate (PET) or polyethylene naphthalate (PEN) can be exemplified. In addition, the first base material 11 does not have to be flexible.

As shown in FIG. 1, the first wiring pattern 12 is formed on the upper surface of the first base material 11. The first wiring pattern 12 in one or more embodiments functions as a lead-out wiring that electrically connects the above-described first electrode group 13 and third electrode 13E to a power supply (not shown).

The first wiring pattern 12 has a first wiring portion 121*a*, a second wiring portion 121*b*, and a first external terminal portion 122. The first wiring portion 121*a* has a U-shaped linear shape. One end of the first wiring portion 121*a* is connected to the second wiring portion 121*b*. The second wiring portion 121*b* has an L-shaped linear shape, and one end of the second wiring portion 121*b* is connected to the first external terminal portion 122. The first external terminal portion 122 is a terminal portion that is electrically connected to a power supply (not shown).

The first wiring pattern 12 is formed by printing a conductive paste on the upper surface of the first base material 11 and solidifying (curing) the conductive paste. The conductive paste is made by mixing conductive particles and a binder resin with water or a solvent and various additives. The conductive paste that makes up the first wiring pattern 12 is a low-resistance conductive paste having a relatively small electrical resistance value. In addition, the method of forming the first wiring pattern 12 is not particularly limited to the above. For example, instead of using the conductive paste, the first wiring pattern 12 may be formed by etching a metal foil.

Specific examples of conductive particles include silver, copper, nickel, tin, bismuth, zinc, indium, palladium, and alloys thereof. In addition, specific examples of the binder resin include acrylic resin, polyester resin, epoxy resin, vinyl resin, urethane resin, phenol resin, polyimide resin, silicone resin, and fluorine resin. In addition, examples of the solvent contained in the conductive paste include α-terpineol, butyl carbitol acetate, butyl carbitol, 1-decanol, butyl cellosolve, diethylene glycol monoethyl ether acetate, and tetradecane.

Although not particularly limited, in one or more embodiments, a silver paste containing silver as a main component of conductive particles or a copper paste containing copper as a main component of conductive particles is used as the low-resistance conductive paste. In addition, metal salts may be used as conductive particles contained in the conductive paste. As metal salts, salts of the metals described above can be mentioned. In addition, the binder resin may be omitted from the conductive paste described above. In addition, instead of the conductive paste described above, a conductive ink may be used.

The method of applying the conductive paste is not particularly limited, but either a contact application method or a non-contact application method may be used. Specific examples of the contact application method include screen printing, gravure printing, offset printing, gravure offset printing, and flexographic printing. On the other hand, specific examples of the non-contact application method include inkjet printing, a spray coating method, a dispense coating method, and a jet dispensing method. In addition, the heat source for curing the conductive paste is not particularly limited, but examples thereof include an electric heating oven, an infrared oven, a far-infrared oven (IR), a near-infrared oven (NIR), and a laser irradiation device, and a heat treatment using a combination thereof may also be applied.

The first electrode group 13 is connected to the first wiring portion 121*a* of the first wiring pattern 12. The first electrode group 13 includes a plurality of (four in this example) first electrodes 13A to 13D. In the first electrode group 13, the first electrodes 13A to 13D are arranged on the first wiring portion 121*a* so as to be electrically connected in parallel to each other. In addition, in one or more embodiments, the first electrodes 13A to 13D are arranged so as to surround the third electrode 13E and the fourth electrode 14E.

In one or more embodiments, the first electrodes 13A to 13D all have the same configuration. Therefore, the configuration of the first electrode 13A will be described herein as a representative example.

The first electrode 13A is a comb-shaped electrode. The first electrode 13A has a connection wiring portion 131 and a plurality of (three in this example) comb-tooth portions 132. The connection wiring portion 131 is a linear portion extending along the Y direction in the diagram, and one end of the connection wiring portion 131 is connected to the first wiring portion 121*a* of the first wiring pattern 12.

The plurality of comb-tooth portions 132 are connected to the other end side of the connection wiring portion 131. As shown in FIGS. 1 and 2, the plurality of comb-tooth portions 132 are aligned in parallel along the Y direction in the diagrams, and protrude from the connection wiring portion 131 in the +X direction in the diagrams.

The second electrode group 14 is arranged on the first base material 11 so as to be adjacent to the first electrode group 13. The second electrode group 14 includes a plurality of (four in this example) second electrodes 14A to 14D.

The second electrodes 14A to 14D are arranged adjacent to the first electrodes 13A to 13D, respectively. In addition, the second electrodes 14A to 14D are arranged slightly spaced apart from the first electrodes 13A to 13D so as to be electrically insulated from the first electrodes 13A to 13D. In one or more embodiments, the second electrodes 14A to 14D are arranged so as to surround the third electrode 13E and the fourth electrode 14E, similarly to the first electrodes 13A to 13D.

In addition, in one or more embodiments, the plurality of first pressure sensitive sensors 2A to 2D are arranged so as to surround the second pressure sensitive sensor 2E, but the invention is not limited to this. For example, in the pressure sensitive sensor unit 1A, the first pressure sensitive sensor and the second pressure sensitive sensor may be arranged alternately.

In one or more embodiments, the second electrodes 14A to 14D all have the same configuration. Therefore, the configuration of the second electrode 14A will be described herein as a representative example.

The second electrode 14A has a planar shape point-symmetrical with respect to the first electrode 13A. The second electrode 14A has a connection wiring portion 141 and a plurality of (three in this example) comb-tooth portions 142. The connection wiring portion 141 is a linear portion extending along the Y direction in the diagram. The plurality of comb-tooth portions 142 are connected to one end side of the connection wiring portion 141. The plurality of comb-tooth portions 142 are aligned along the Y direction in the diagram, and protrude from the connection wiring portion 141 in the −X direction in the diagram. Then, the comb-tooth portions 142 are inserted between the comb-tooth portions 132 of the first electrode 13A, and face the comb-tooth portions 132 of the first electrode 13A along the Y direction in the diagram.

The above-described first and second electrodes 13A to 13D and 14A to 14D are formed by printing a conductive paste on the upper surface of the first base material 11 and then solidifying (curing) the conductive paste. The conductive paste is a high-resistance conductive paste having a relatively high electrical resistance. In addition, instead of the conductive paste, a conductive ink may be used.

Examples of conductive particles contained in the conductive paste include carbon. Specific examples of the carbon include graphite and carbon black. In addition, specific examples of the binder resin and the solvent include the materials described above. In addition, the binder resin may be omitted from the conductive paste. The method of applying the conductive paste is not particularly limited, but either the contact application method or the non-contact application method described above may be used.

The second wiring pattern 15 is connected to the other ends of the connection wiring portions 141 of the second electrodes 14A to 14D. The second wiring pattern 15 electrically connects the second electrodes 14A to 14D and the resistive body 16 to each other.

The second wiring pattern 15 is formed of the same material as the first wiring pattern 12 although there is no particular limitation thereto. In addition, although not particularly limited, the second wiring pattern 15 is formed by printing a conductive paste on the upper surface of the first base material 11 and solidifying (curing) the conductive paste, similarly to the first wiring pattern 12.

The second wiring pattern 15 has a third wiring portion 151 and a first resistive body connection portion 153. The third wiring portion 151 has a linear shape, and the second electrodes 14A to 14D are arranged on the third wiring portion 151 so as to be electrically connected in parallel to each other.

The first resistive body connection portion 153 is connected to the other end of the third wiring portion 151. The first resistive body connection portion 153 in one or more embodiments is a land pattern that is wider than the third wiring portion 151, although there is no particular limitation thereto.

The resistive body 16 is connected to the first resistive body connection portion 153. The resistive body 16 in one or more embodiments is arranged on the second wiring pattern 15 so as to be electrically connected in series to the second electrode group 14. The resistive body 16 has a resistance value $R_1$ (constant) larger than the resistance value $R_{x2}$ in the ON state of the second pressure sensitive sensor 2E. The resistive body 16 is provided to make the combined resistance $R_0(=R_1+R_{x1})$ of the resistance value $R_1$ of the resistive body 16 and the resistance value $R_{x1}$ in the ON state of the first pressure sensitive sensors 2A to 2D larger than the resistance value $R_{x2}$ in the ON state of the second pressure sensitive sensor 2E ($R_0>R_{x2}$).

In addition, the "ON state" of the first pressure sensitive sensors 2A to 2D is a state in which the first electrodes 13A to 13D and the second electrodes 14A to 14D are electrically connected to each other through connection bodies 22A to 22D, and the "ON state" of the second pressure sensitive sensor 2E is a state in which the third electrode 13E and the fourth electrode 14E are electrically connected to each other through a connection body 22E. Here, in one or more embodiments, "electrically connecting" a connection body and an electrode means a state in which the resistance value between the connection body and the electrode is equal to or less than a predetermined threshold value, and does not include a state in which the connection body and the electrode are simply in contact with each other. In addition, the resistance values $R_{x1}$ and $R_{x2}$ in the "ON state" are variables that change according to the magnitude of the load, as will be described later.

The resistive body 16 may be a resistor although there is no particular limitation thereto. Alternatively, the resistive body 16 may be formed by printing a high-resistance conductive paste on the upper surface of the first base material 11 and solidifying (curing) the conductive paste. Examples of conductive particles contained in the conductive paste include the above-described carbon. In addition, specific examples of the binder resin and the solvent include the materials described above. In addition, the binder resin may be omitted from the conductive paste. The method of applying the conductive paste is not particularly limited, but either the contact application method or the non-contact application method described above may be used.

In one or more embodiments, the resistive body 16 is electrically connected in series to the second electrode group 14 and is arranged on the power supply side with respect to the first pressure sensitive sensors 2A to 2D, but is not limited thereto. For example, the resistive body 16 may be electrically connected in series to the first electrode group 13 and arranged on the power supply side with respect to the first pressure sensitive sensors 2A to 2D.

Although not particularly shown, specifically, in the first wiring pattern 12 shown in FIG. 1, by interposing the resistive body 16 between the first wiring portion 121*a* and the second wiring portion 121*b*, the resistive body 16 can be electrically connected in series to all of the first electrodes 13A to 13D included in the first electrode group 13. In this case as well, the above-described combined resistance $R_0(=R_1+R_{x1})$ can be made larger than the resistance value $R_{x2}$ in the ON state of the second pressure sensitive sensor 2E ($R_0>R_{x2}$).

The comb-shaped third electrode 13E is connected to the other end of the second wiring portion 121*b* of the first wiring pattern 12. The third electrode 13E has the same configuration as the first electrode 13A, and includes a connection wiring portion 131 and a plurality of comb-tooth portions 132. However, the connection wiring portion 131 of the third electrode 13E extends along the X direction in the diagram. In addition, the comb-tooth portions 132 are aligned along the X direction in the diagram, and protrude from the connection wiring portion 131 in the −Y direction in the diagram.

The comb-shaped fourth electrode 14E is arranged on the first base material 11 so as to be adjacent to the third electrode 13E. The fourth electrode 14E is arranged slightly spaced apart from the third electrode 13E so as to be electrically insulated from the third electrode 13E.

The fourth electrode 14E has the same configuration as the second electrode 14A, and includes a connection wiring portion 141 and a plurality of comb-tooth portions 142. However, the connection wiring portion 141 of the fourth electrode 14E extends along the X direction in the diagram. In addition, the comb-tooth portions 142 of the fourth electrode 14E are aligned along the X direction in the diagram, and protrude from the connection wiring portion 141 in the +Y direction in the diagram.

The third wiring pattern 17 is connected to the resistive body 16 and the fourth electrode 14E. The third wiring pattern 17 functions as a lead-out wiring that electrically connects the second electrode group 14 and the fourth electrode 14E to the ground (not shown).

The third wiring pattern 17 has a fourth wiring portion 171*a*, a fifth wiring portion 171*b*, a second external terminal portion 172, and a second resistive body connection portion 173. The fourth wiring portion 171*a* has a linear shape extending in the Y direction in the diagram, and one end of the fourth wiring portion 171*a* is connected to the second external terminal portion 172.

The second external terminal portion 172 is a terminal portion that is electrically connected to the ground (not shown). In addition, in one or more embodiments, the first external terminal portion 122 of the first wiring pattern 12 is electrically connected to a power supply (not shown) and the second external terminal portion 172 of the third wiring pattern 17 is connected to the ground (not shown), but the invention is not limited thereto. Contrary to the above-described embodiments, the first external terminal portion 122 may be electrically connected to the ground (not shown), and the second external terminal portion 172 may be connected to the power supply (not shown).

The other end of the fourth wiring portion 171*a* is connected to the second resistive body connection portion 173. The second resistive body connection portion 173 is a land pattern that is wider than the fourth wiring portion 171*a*, although there is no particular limitation thereto. The resistive body 16 is connected to the second resistive body connection portion 173, and the fourth wiring portion 171*a* is electrically connected to the second electrode group 14 through the resistive body 16 and the third wiring pattern 17. As a result, the second electrode group 14 is electrically connected to the ground (not shown).

The fifth wiring portion 171*b* has a linear shape extending in the X direction in the diagram, and one end of the fifth wiring portion 171*b* is connected to the fourth wiring portion 171*a*. On the other hand, the other end of the fifth wiring portion 171*b* is connected to the fourth electrode 14E. Therefore, the fourth electrode 14E is electrically connected to the ground (not shown) through the third wiring pattern 17.

The resistance value output from the pressure sensitive sensor unit 1A according to one or more embodiments is a resistance value between the first external terminal portion 122 and the second external terminal portion 172 although there is no particular limitation thereto. The resistance value can be obtained by using, for example, a resistance measuring device such as a tester connected to the first external terminal portion 122 and the second external terminal portion 172.

As shown in FIGS. 1 and 2, the upper membrane substrate 20 is arranged above the lower membrane substrate 10. The upper membrane substrate 20 has a second base material 21 and a plurality of (five in this example) connection bodies 22A to 22E.

The second base material 21 of the upper membrane substrate 20 is a film-like member formed of a flexible and electrically insulating material. Examples of the material that makes up the second base material 21 include resin materials. More specifically, polyethylene terephthalate (PET) or polyethylene naphthalate (PEN) can be exemplified. In addition, a metal film may be used as the second base material 21. In this case, the second base material 21 may have the functions of the connection bodies 22A to 22E, that is, the second base material 21 may also serve as the connection bodies 22A to 22E.

As shown in FIGS. 1 and 2, the disk-shaped connection bodies 22A to 22E are formed on the lower surface of the second base material 21. The connection bodies 22A to 22D are members that come into contact with the first electrodes 13A to 13D and the second electrodes 14A to 14D to electrically connect the first electrodes 13A to 13D and the second electrodes 14A to 14D to each other. That is, the connection body 22A comes into contact with the first electrode 13A and the second electrode 14A to electrically connect the first electrode 13A and the second electrode 14A to each other. The connection body 22B comes into contact with the first electrode 13B and the second electrode 14B to electrically connect the first electrode 13B and the second electrode 14B to each other. The connection body 22C comes into contact with the first electrode 13C and the second electrode 14C to electrically connect the first electrode 13C and the second electrode 14C to each other. The connection body 22D comes into contact with the first electrode 13D and the second electrode 14D to electrically connect the first electrode 13D and the second electrode 14D to each other. In addition, the connection body 22E is also a member that comes into contact with the third electrode 13E and the fourth electrode 14E to electrically connect the third electrode 13E and the fourth electrode 14E to each other.

All of the connection bodies 22A to 22E are arranged so as to face parts of the connection wiring portions 131 and 141 and the comb-tooth portions 132 and 142, and have a size to include almost the entire comb-tooth portions 132 and 142 thereinside in plan view.

The connection bodies 22A to 22E are formed by printing a low-resistance conductive paste on the lower surface of the second base material 21 and curing the low-resistance conductive paste, similarly to the first wiring pattern 12 described above. That is, the connection bodies 22A to 22E are formed of a material having a lower electrical resistivity than the material that makes up the first to fourth electrodes 13A to 13E and 14A to 14E.

In addition, the connection bodies 22A to 22E may have a protective layer covering the above-described layer that is formed by printing and curing a high-resistance conductive paste. This protective layer is formed by printing and curing the above-described high-resistance conductive paste.

The spacer 30 is a film-like member formed of a flexible and electrically insulating material, similar to the first and second base materials 11 and 21 described above. Examples of the material that makes up the spacer 30 include resin materials. More specifically, polyethylene terephthalate (PET) or polyethylene naphthalate (PEN) can be exemplified. Alternatively, a double-sided adhesive tape can be exemplified as the spacer 30. A double-sided adhesive tape having adhesive layers formed on both surfaces of a base material may be used, or a double-sided adhesive tape having only adhesive layers may be used.

As shown in FIGS. 1 and 2, the spacer 30 is interposed between the first base material 11 and the second base material 21, and the lower membrane substrate 10 and the upper membrane substrate 20 are stacked with the spacer 30 interposed therebetween. Specifically, the upper surface of the base material 11 of the lower membrane substrate 10 and the lower surface of the spacer 30 are attached to each other through an adhesive layer (not shown), and the upper surface of the spacer 30 and the lower surface of the base material 21 of the upper membrane substrate 20 are attached to each other through an adhesive layer (not shown).

The spacer 30 has a plurality of (four in this example) first openings 31 and a second opening 32. The plurality of first openings 31 are arranged so as to surround the second opening 32, as shown in FIG. 1. In addition, when the first pressure sensitive sensor and the second pressure sensitive sensor are arranged alternately as described above, the first opening and the second opening are also arranged alternately.

Each of the first openings 31 has a circular planar shape. Parts of the connection wiring portions 131 of the first electrodes 13A to 13D, the comb-tooth portions 132 of the first electrodes 13A to 13D, parts of the connection wiring portions 141 of the second electrodes 14A to 14D, and the comb-tooth portions 142 of the second electrodes 14A to 14D are housed in the first openings 31. In addition, the connection bodies 22A to 22D of the upper membrane substrate 20 are also housed in the first openings 31. In addition, the diameters of the connection bodies 22A to 22D may be larger than the inner diameter of the first opening 31.

When the membrane substrates 10 and 20 are stacked with the spacer 30 interposed therebetween, the connection bodies 22A to 22D and the comb-tooth portions 132 and 142 of the first and second electrodes 13A to 13D and 14A to 14D face each other with the first opening 31 interposed therebetween. In addition, similarly, the connection bodies 22A to 22D and parts of the connection wiring portions 131 and 141 of the first and second electrodes 13A to 13D and 14A to 14D face each other.

The second opening 32 also has a circular planar shape, and parts of the connection wiring portions 131 and 141 of the third and fourth electrodes 13E and 14E and the comb-tooth portions 132 and 142 of the third and fourth electrodes 13E and 14E are housed in the second opening 32. In addition, the connection body 22E of the upper membrane substrate 20 is also housed in the second opening 32. In addition, the diameter of the connection body 22E may be larger than the inner diameter of the second opening 32.

In addition, when the membrane substrates 10 and 20 are stacked with the spacer 30 interposed therebetween, the connection body 22E and the comb-tooth portions 132 and 142 of the third and fourth electrodes 13E and 14E face each other with the second opening 32 interposed therebetween. In addition, similarly, the connection body 22E and parts of the connection wiring portions 131 and 141 of the third and fourth electrodes 13E and 14E face each other.

As shown in FIGS. 1 and 2, the spacer 30 ensures a distance between the connection bodies 22A to 22D and the comb-tooth portions 132 and 142 of the first and second electrodes 13A to 13D and 14A to 14D. In addition, the spacer 30 ensures a distance between the connection body 22E and the comb-tooth portions 132 and 142 of the third and fourth electrodes 13E and 14E.

Here, the second opening 32 in one or more embodiments has the same width as the first opening 31. That is, as shown in FIG. 2, the diameter $D_2$ of the second opening 32 is the same as the diameter $D_1$ of the first opening 31 ($D_1=D_2$).

In addition, although the diameter $D_1$ of the first opening 31 and the diameter $D_2$ of the second opening 32 are the same length in one or more embodiments, the invention is not limited thereto. The diameter $D_1$ of the first opening 31 may be larger than the diameter $D_2$ of the second opening 32 ($D_1>D_2$). Thus, the width of the first opening 31 is larger than the width of the second opening 32, so that the second base material 21 is likely to bend at the first opening 31. Therefore, since the magnitude of the on-load of the first pressure sensitive sensors 2A to 2D can be reduced, it is possible to improve the sensitivity of the first pressure sensitive sensors 2A to 2D in the low load range. In addition, the "on-load" is a load required to switch the pressure sensitive sensor from the OFF state to the ON state.

In addition, the planar shape of each of the first and second openings 31 and 32 is not limited to a circle, but may be, for example, an ellipse, an oval, a rectangle, or a polygon. In addition, the shapes of the connection bodies 22A to 22E or the electrodes 13A to 13E and 14A to 14E are not particularly limited to those described above, and may be, for example, shapes corresponding to the shapes of the first and second openings 31 and 32.

In addition, in one or more embodiments, the thickness of the spacer 30 is set so that the connection bodies 22A to 22E are not in contact with the comb-tooth portions 132 and 142 when no load is applied, but the invention is not particularly limited thereto. The thickness of the spacer 30 may be set so that the connection bodies 22A to 22E are always in contact with the comb-tooth portions 132 and 142. Similarly, the thickness of the spacer 30 may be set so that the connection bodies 22A to 22E are always in contact with the connection wiring portions 131 and 141.

In addition, in one or more embodiments, all of the first pressure sensitive sensors 2A to 2D and the second pressure sensitive sensor 2E are formed by the membrane substrates 10 and 20 and the spacer 30 of the pressure sensitive sensor sheet 2. However, the invention is not limited thereto, and the first and second pressure sensitive sensors 2A to 2E may be formed by separate membrane substrates and spacers. That is, the pressure sensitive sensor unit may be a unit formed by a plurality of pressure sensitive sensor sheets.

In addition, in this case, since the electrodes formed on the base material are likely to bend by reducing the thickness of the spacer of the pressure sensitive sensor sheet in which the first pressure sensitive sensor for low load is formed, it is possible to improve the sensitivity of the sensor in the low load range. Alternatively, since the electrodes are likely to bend by reducing the thickness of the base material, it is possible to improve the sensitivity of the sensor in the low load range.

In the pressure sensitive sensor sheet 2 according to one or more embodiments, the connection bodies 22A to 22D and the first and second electrodes 13A to 13D and 14A to 14D form the first pressure sensitive sensors 2A to 2D and function as first detection units 135A to 135D that detect a load applied to the first pressure sensitive sensors 2A to 2D. That is, the connection body 22A, the first electrode 13A, and the second electrode 14A form the first pressure sensitive sensor 2A and function as the first detection unit 135A that detects a load applied to the first pressure sensitive sensor 2A. The connection body 22B, the first electrode 13B, and the second electrode 14B form the first pressure sensitive sensor 2B and function as the first detection unit 135B that detects a load applied to the first pressure sensitive sensor 2B. The connection body 22C, the first electrode 13C, and the second electrode 14C form the first pressure sensitive sensor 2C and function as the first detection unit 135C that detects a load applied to the first pressure sensitive sensor 2C. The connection body 22D, the first electrode 13D, and the second electrode 14D form the first pressure sensitive sensor 2D and function as the first detection unit 135D that detects a load applied to the first pressure sensitive sensor 2D. On the other hand, the connection body 22E and the third and fourth electrodes 13E and 14E form the second pressure sensitive sensor 2E and function as a second detection unit 135E that detects a load applied to the second pressure sensitive sensor 2E.

Specifically, when a load is applied to the first detection units 135A to 135D of the first pressure sensitive sensor 2A to 2D, the second base material 21 bends downward at the first opening 31, and the connection bodies 22A to 22D come into contact with the first and second electrodes 13A to 13D and 14A to 14D. Here, as the magnitude of the load applied to the first detection units 135A to 135D increases, the contact area between the connection bodies 22A to 22D and the first and second electrodes 13A to 13D and 14A to 14D increases. Therefore, the resistance value $R_{x1}$ between the first and second electrodes 13A to 13D and 14A to 14D decreases. That is, in the first pressure sensitive sensors 2A to 2D, as the magnitude of the applied load increases, the resistance value $R_{x1}$ that is output (the first output) decreases.

Similarly, even when a load is applied to the second detection unit 135E of the second pressure sensitive sensor 2E, the second base material 21 bends downward at the second opening 32, and the connection body 22E comes into contact with the third and fourth electrodes 13E and 14E. In this case as well, as the magnitude of the load applied to the second detection unit 135E increases, the contact area between the connection body 22E and the third and fourth electrodes 13E and 14E increases. Therefore, the resistance value $R_{x2}$ between the third and fourth electrodes 13E and 14E decreases. That is, in the second pressure sensitive sensor 2E as well, as the magnitude of the applied load increases, the resistance value $R_{x2}$ that is output (the second output) decreases.

In one or more embodiments, the first electrodes 13A to 13D and the third electrode 13E have the same configuration, and the second electrodes 14A to 14D and the fourth electrode 14E have the same configuration. Therefore, the resistance value $R_{x1}$ in the ON state of the first pressure sensitive sensors 2A to 2D is approximately the same as the resistance value $R_{x2}$ in the ON state of the second pressure sensitive sensor 2E ($R_{x1}=R_{x2}$).

In addition, in one or more embodiments, the first pressure sensitive sensors 2A to 2D are electrically connected in parallel to each other between the first wiring pattern 12 and the second wiring pattern 15. Then, the first pressure sensitive sensor 2E is electrically connected in parallel with the first pressure sensitive sensors 2A to 2D between the first wiring pattern 12 and the second wiring pattern 15.

A plurality of (four in this example) first load transmitting members 3A to 3D and a second load transmitting member 4 are provided on the upper surface of the second base material 21 of the pressure sensitive sensor sheet 2. The first load transmitting members 3A to 3D are members (actuators) for transmitting a load to the first pressure sensitive sensors 2A to 2D. On the other hand, the second load transmitting member 4 is a member (actuator) for transmitting a load to the second pressure sensitive sensor 2E.

In one or more embodiments, the first load transmitting members 3A to 3D and the second load transmitting member 4 are members each having a circular planar shape and having elasticity. That is, the first load transmitting members 3A to 3D and the second load transmitting member 4 are members that contract when a load is applied but return to their initial shapes before the load is applied when the load is removed. In addition, the planar shapes of the first load transmitting members 3A to 3D and the second load transmitting member 4 are not limited to the circular shape. The planar shape is not limited to a circle, and may be, for example, an ellipse, an oval, a rectangle, or a polygon. In addition, the first load transmitting members 3A to 3D and the second load transmitting member 4 may be rigid bodies.

Specific examples of the member having elasticity as described above include a resin member, a rubber member, and a spring member. Among these, it is particularly preferable to use a sponge-like resin member containing fine bubbles.

As shown in FIG. 2, the first load transmitting members 3A to 3D are interposed between the first detection units 135A to 135D of the first pressure sensitive sensors 2A to 2D and the plate member 5. Specifically, the lower surfaces of the first load transmitting members 3A to 3D are attached to the upper surface of the second base material 21 of the upper membrane substrate 20 through an adhesive layer (not shown), and the upper surfaces of the first load transmitting members 3A to 3D are attached to the lower surface of the plate member 5 through an adhesive layer (not shown). That is, both the upper and lower surfaces of the first load transmitting members 3A to 3D are fixed to the second base material 21 and the plate member 5.

In addition, the first load transmitting members 3A to 3D are bonded to the second base material 21 and the plate member 5 through an adhesive layer, but the invention is not limited thereto. For example, the first load transmitting members 3A to 3D may be bonded to the second base material 21 or the plate member 5 by being applied and formed thereon.

The second load transmitting member 4 is interposed between the second detection unit 135E of the second pressure sensitive sensor 2E and the plate member 5. The lower surface of the second load transmitting member 4 is attached to the upper surface of the second base material 21 of the upper membrane substrate 20 through an adhesive layer (not shown), but the upper surface of the second load transmitting member 4 is spaced apart from the plate member 5. That is, only the lower surface of the second load transmitting member 4 is fixed to the second base material 21.

In addition, the second load transmitting member 4 is bonded to the second base material 21 through an adhesive layer, but the invention is not limited thereto. For example, the second load transmitting member 4 may be bonded to the second base material 21 by being applied and formed thereon. In addition, the lower surface of the second load transmitting member 4 is fixed to the second base material 21, but the invention is not limited thereto. The upper surface of the second load transmitting member 4 may be bonded to the plate member 5, and the lower surface of the second load transmitting member 4 may be spaced apart from the second base material 21.

The height $T_1$ of the first load transmitting members 3A to 3D is higher than the height $T_2$ of the second load transmitting member 4 ($T_1>T_2$). In this manner, by making a difference between the height $T_1$ of the first load transmitting members 3A to 3D and the height $T_2$ of the second load transmitting member 4, the load can be transmitted to the first pressure sensitive sensors 2A to 2D before the second pressure sensitive sensor 2E. That is, when a low load is applied to the pressure sensitive sensor unit 1A, the load is transmitted to the first pressure sensitive sensors 2A to 2D by the first load transmitting members 3A to 3D, but the load is not transmitted to the second pressure sensitive sensor 2E by the second load transmitting member 4. On the other hand, when a high load is applied to the pressure sensitive sensor unit 1A, the load is also transmitted to the second pressure sensitive sensor 2E by the second load transmitting member 4.

The plate member 5 overlaps the pressure sensitive sensor sheet 2 with the first and second load transmitting members 3A to 3D interposed therebetween, and is arranged so as to include the first and second pressure sensitive sensors 2A to 2E in plan view. The plate member 5 is a plate-shaped member formed of a material having a predetermined rigidity. By forming the plate member 5 with a member that is difficult to bend, it is possible to generate a uniform pressing force on the lower surface of the plate member 5. Examples of the material that makes up the plate member 5 include an ABS (acrylonitrile butadiene styrene) resin, glass, and a polycarbonate resin.

Figure 3A:
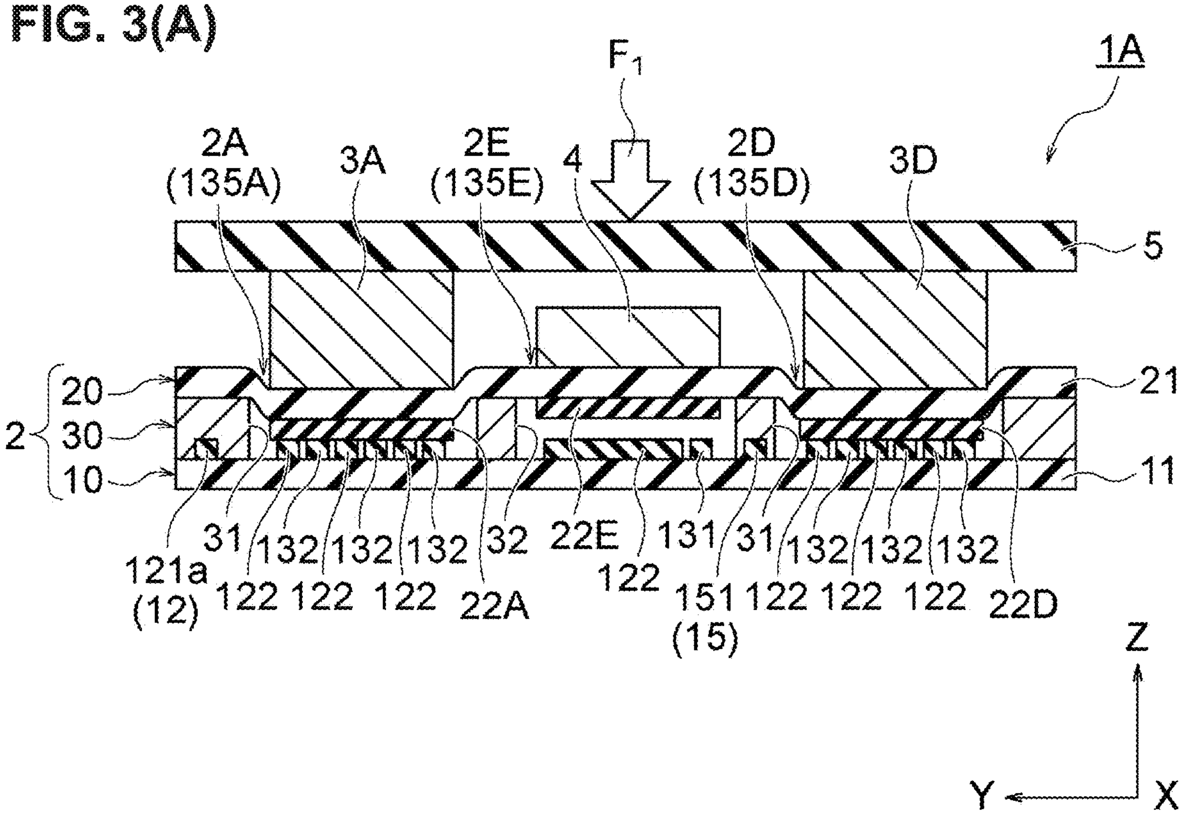
FIG. 3(A) is a cross-sectional view showing a state in which a low load is applied to the pressure sensitive sensor unit in FIG. 2.
Figure 3B:
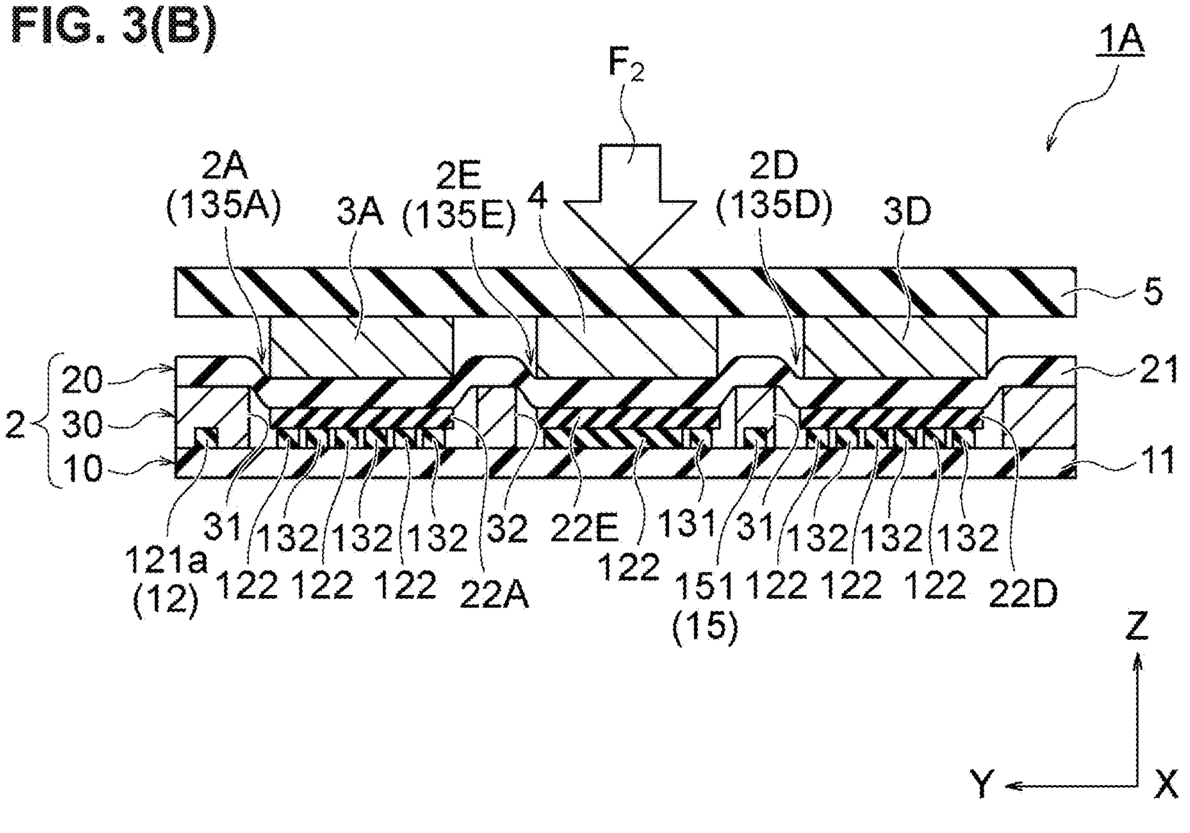
FIG. 3(B) is a cross-sectional view showing a state in which a high load is applied to the pressure sensitive sensor unit in FIG. 2.

The load transmission by the first load transmitting members 3A to 3D and the second load transmitting member 4 will be specifically described with reference to FIGS. 3(A) and 3(B). FIG. 3(A) is a cross-sectional view showing a state in which a low load is applied to the pressure sensitive sensor unit 1A in FIG. 2, and FIG. 3(B) is a cross-sectional view showing a state in which a high load is applied to the pressure sensitive sensor unit 1A in FIG. 2.

As shown in FIG. 3(A), when a low load $F_1$ is applied to the pressure sensitive sensor unit 1A from the plate member 5 side, the load is transmitted from the plate member 5 to the first load transmitting members 3A to 3D bonded to the lower surface of the plate member 5. That is, the first load transmitting members 3A to 3D are pressed in the −Z direction in the diagram by the lower surface of the plate member 5.

Then, the second base material 21 is bent downward at the first opening 31 by the load transmitted from the first load transmitting members 3A to 3D. That is, the first load transmitting members 3A to 3D concentrate the load on the first pressure sensitive sensors 2A to 2D. As a result, at the first opening 31 of the spacer 30, the connection bodies 22A to 22D formed on the lower surface of the second base material 21 are pressed downward to be electrically connected to the first and second electrode groups 13 and 14 of the first pressure sensitive sensors 2A to 2D.

On the other hand, since the amount of contraction of the first load transmitting members 3A to 3D is small, the second load transmitting member 4 is spaced apart from the plate member 5 and accordingly, the load is not transmitted from the plate member 5 to the second load transmitting member 4. Therefore, the second load transmitting member 4 does not press the second base material 21, and the connection body 22E is not pressed downward. That is, the third electrode 13E and the fourth electrode 14E of the first pressure sensitive sensor 2E are maintained in a state (off state) in which these are insulated from each other.

As shown in FIG. 3(B), when a high load $F_2$ is applied to the pressure sensitive sensor unit 1A from the plate member 5 side, the plate member 5 is pressed further downward and the first load transmitting members 3A to 3D contract significantly. Therefore, the lower surface of the plate member 5 comes into contact with the second load transmitting member 4. That is, in addition to the first load transmitting members 3A to 3D, the second load transmitting member 4 is also pressed in the −Z direction in the diagram by the lower surface of the plate member 5.

The second base material 21 is bent downward at the second opening 32 by the load transmitted from the second load transmitting member 4. As a result, at the second opening 32 of the spacer 30, the connection body 22E is pressed downward to be electrically connected to the third and fourth electrodes 13E and 14E of the second pressure sensitive sensor 2E.

Thus, in the pressure sensitive sensor unit 1A according to one or more embodiments, only the first pressure sensitive sensors 2A to 2D are in the ON state when a low load is applied, whereas not only the first pressure sensitive sensors 2A to 2D but also the second pressure sensitive sensor 2E is in the ON state when a high load is applied.

In addition, as shown in FIGS. 1 and 2, the first load transmitting members 3A to 3D are arranged on the upper surface of the second base material 21 so that the first load transmitting members 3A to 3D surround the second load transmitting member 4. That is, since the first pressure sensitive sensors 2A to 2D according to one or more embodiments are arranged around the second pressure sensitive sensor 2E, the first load transmitting members 3A to 3D are also arranged around the second load transmitting member 4. Therefore, when a load is applied to the pressure sensitive sensor unit 1A, the load can be transmitted uniformly from the lower surface of the plate member 5 while stably supporting the plate member 5 by the plurality of first load transmitting members 3A to 3D arranged around the second load transmitting member 4. As a result, it is possible to detect the load accurately.

Figure 4:
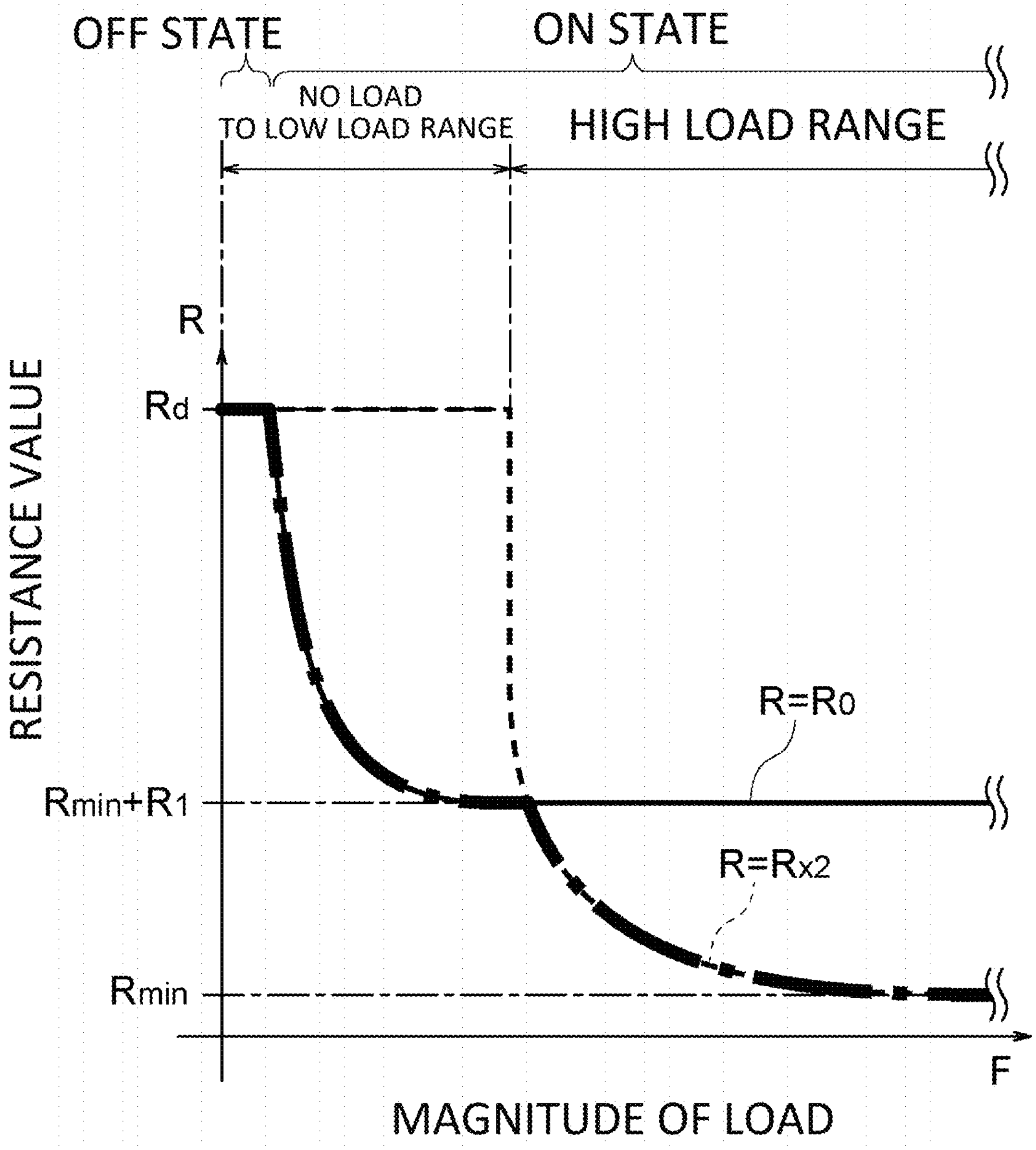
FIG. 4 is a graph showing the relationship between the magnitude F of a load applied to the pressure sensitive sensor unit according to one or more embodiments of the invention and a resistance value R output from the pressure sensitive sensor unit.

The change in the resistance value output from the pressure sensitive sensor unit 1A as described above will be described with reference to FIG. 4 in addition to FIGS. 1, 2, 3(A) and 3(B). FIG. 4 is a graph showing the relationship between the magnitude F of a load applied to the pressure sensitive sensor unit 1A according to one or more embodiments and the resistance value R output from the pressure sensitive sensor unit 1A. In the graph of FIG. 4, the solid line indicates the combined resistance $R_0$ of the resistance value $R_{x1}$ of the first pressure sensitive sensors 2A to 2D and the resistance value $R_1$ of the resistive body 16, and the broken line indicates the resistance value $R_{x2}$ of the second pressure sensitive sensor 2E. In addition, the dashed line indicates the resistance value R output from the pressure sensitive sensor unit 1A, and in one or more embodiments, the resistance value R is a resistance value between the first external terminal portion 122 and the second external terminal portion 172.

First, as shown in FIG. 2, when there is no load, the electrodes 13A to 13E and 14A to 14E of all the pressure sensitive sensors 2A to 2E are electrically insulated from each other, so that all the pressure sensitive sensors 2A to 2E are in the OFF state. In this case, as shown in FIG. 4, a resistance value $R_d$ of several hundred MΩ is output from the pressure sensitive sensor unit 1A as the resistance value R.

Then, as shown in FIG. 3(A), when the low load $F_1$ equal to or greater than a predetermined level is applied to the pressure sensitive sensor unit 1A, the first pressure sensitive sensors 2A to 2D are switched to the ON state. In other words, at the low load $F_1$ equal to or lower than a predetermined level, the resistance value between the connection bodies 22A to 22D and the first and second electrodes 13A to 13D and 14A to 14D exceeds a threshold value, so that the first pressure sensitive sensors 2A to 2D are maintained in the OFF state. In addition, the second pressure sensitive sensor 2E is maintained in the OFF state in the low load range.

At this time, as shown in FIG. 1, the first pressure sensitive sensors 2A to 2D are electrically connected in parallel to each other, and the resistive body 16 is electrically connected in series to the second electrode group 14 of the first pressure sensitive sensors 2A to 2D. Therefore, the resistance value R output from the pressure sensitive sensor unit 1A is the combined resistance $R_0$ of the resistance value $R_{x1}$ of the first pressure sensitive sensors 2A to 2D and the resistance value $R_1$ of the resistive body 16.

In this case, as shown in FIG. 4, as the magnitude of the load increases in the low load range, the resistance value $R_{x1}$ of the first pressure sensitive sensors 2A to 2D decreases, and finally the resistance value $R_{x1}$ saturates at the minimum resistance value (push-through resistance) $R_{min}$. For this reason, as shown by the solid line in the graph of FIG. 4, the combined resistance $R_0$ also decreases as the magnitude of the load increases, and finally saturates near the resistance value $R_{min}+R_1$.

Then, as shown in FIG. 3(B), when the high load $F_2$ is applied to the pressure sensitive sensor unit 1A, the second pressure sensitive sensor 2E is also switched to the ON state. As shown by the broken line in the graph of FIG. 4, as the magnitude of the load increases in the high load range, the resistance value $R_{x2}$ of the second pressure sensitive sensor 2E decreases. Since no resistive body is connected to the second pressure sensitive sensor 2E and the resistance value $R_1$ of the resistive body 16 described above is larger than the resistance value $R_{x2}$, the resistance value $R_{x2}$ falls below the value of the combined resistance $R_0$ when the magnitude of the high load reaches a magnitude equal to or greater than a predetermined level.

When the resistance value $R_{x2}$ falls below the value of the combined resistance $R_0$ described above, the current flowing through the second pressure sensitive sensor 2E becomes more dominant than the current flowing through the first pressure sensitive sensors 2A to 2D. Therefore, the resistance value R output from the pressure sensitive sensor unit 1A becomes the resistance value $R_{x2}$ of the second pressure sensitive sensor 2E. Thus, in one or more embodiments, by electrically connecting the resistive body 16 in series to the second electrode group 14, the range of the resistance value output in the low load range and the range of the resistance value output in the high load range can be distinguished from each other to avoid duplication.

Then, since the resistance value $R_{x2}$ of the second pressure sensitive sensor 2E saturates near the push-through resistance value $R_{min}$ as the magnitude of the load further increases, the resistance value R output from the pressure sensitive sensor unit 1A also saturates near the push-through resistance value $R_{min}$. Therefore, the resistance value R of the pressure sensitive sensor unit 1A becomes an output shown by the dashed line in FIG. 4.

The pressure sensitive sensor unit 1A described above includes the first load transmitting member 3A to 3D for transmitting a low load to the first pressure sensitive sensor 2A to 2D and the second load transmitting member 4 for transmitting a high load to the second pressure sensitive sensor 2E. Therefore, since the pressure sensitive sensor unit 1A can obtain an output (resistance value R) in both the low load range and the high load range, it is possible to increase the detectable load range.

In addition, in one or more embodiments described above, the first load transmitting members 3A to 3D, the second load transmitting member 4, and the plate member 5 are arranged on the second base material 21 side of the upper membrane substrate 20, but the invention is not limited thereto.

Figure 5:
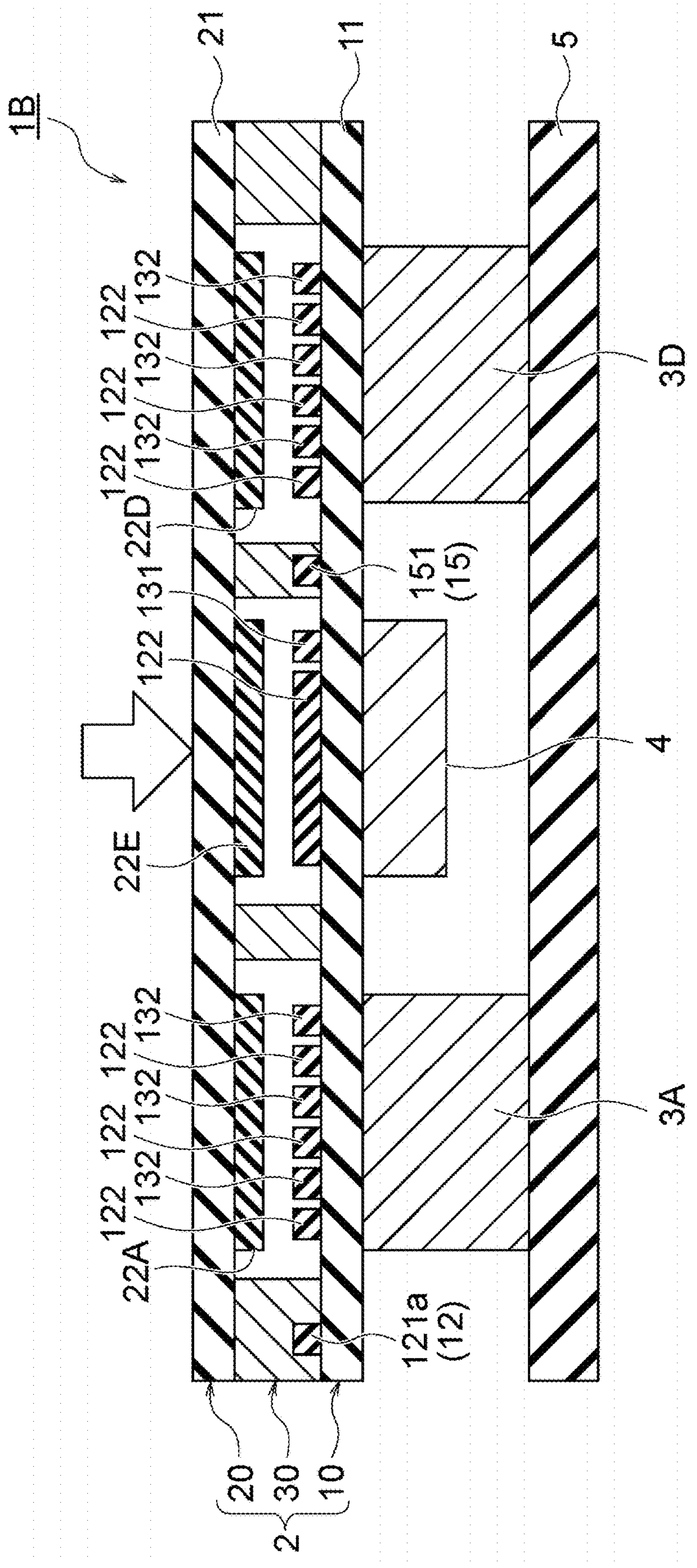
FIG. 5 is a cross-sectional view showing a first modification example of the pressure sensitive sensor unit according to one or more embodiments of the invention.

FIG. 5 is a cross-sectional view showing a first modification example of the pressure sensitive sensor unit according to one or more embodiments. Like a pressure sensitive sensor unit 1B according to the first modification example, the first load transmitting members 3A to 3D, the second load transmitting member 4, and the plate member 5 may be arranged on the first base material 11 side of the lower membrane substrate 10.

In this case, when a low load is applied from the second base material 21 side, the load is transmitted to the first pressure sensitive sensors 2A to 2B by the first load transmitting members 3A to 3D, as in one or more embodiments described above. Then, when a high load is applied from the second base material 21 side, as in one or more embodiments described above, as the first load transmitting members 3A to 3D contract, the second load transmitting member 4 comes into contact with the plate member 5 and accordingly, the load is transmitted to the first pressure sensitive sensors 2A to 2B. In addition, in this case, it is preferable to make the second base material 21 difficult to bend. Specifically, two or more second base materials 21 may be stacked on the spacer 30, or the thickness of the second base material 21 may be increased. In addition, as the first base material 11 to which the load is transmitted from the first and second load transmitting members 3A to 3D and 4, a flexible one is used.

In addition, in one or more embodiments described above, the height $T_1$ of the first load transmitting members 3A to 3D is set to be higher than the height $T_2$ of the second load transmitting member 4 so that a load is less likely to be applied to the second pressure sensitive sensor 2E in the low load range, but the invention is not limited thereto.

Figure 6:
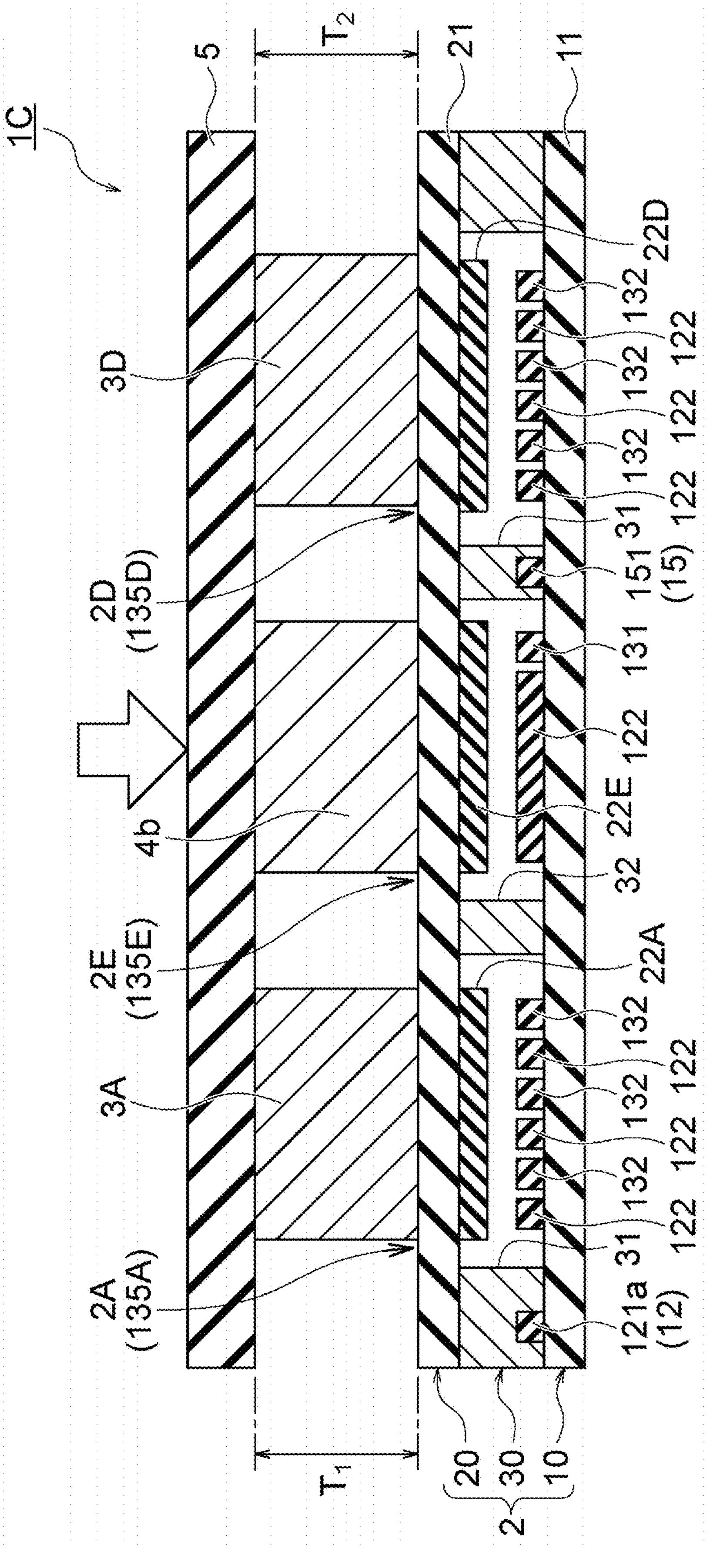
FIG. 6 is a cross-sectional view showing a second modification example of the pressure sensitive sensor unit according to one or more embodiments of the invention.

FIG. 6 is a cross-sectional view showing a second modification example of the pressure sensitive sensor unit according to one or more embodiments. As in a pressure sensitive sensor unit 1C according to the second modification example, a second load transmitting member 4*b* may be made softer than the first load transmitting members 3A to 3D so that a load is less likely to be applied to the second pressure sensitive sensor 2E in the low load range. As a material that makes up the second load transmitting member 4*b*, a material having a low Young's modulus among the above-described sponge-like resin material, rubber material, and spring material may be used.

In addition, in this case, the height $T_1$ of the first load transmitting members 3A to 3D and the height $T_2$ of the second load transmitting member 4*b* are the same ($T_1=T_2$). Since the first load transmitting members 3A to 3D are harder than the second load transmitting member 4*b*, a load is more easily transmitted to the first load transmitting members 3A to 3D than to the second load transmitting member 4*b* in the low load range. Therefore, in the second modification example as well, similarly to one or more embodiments described above, a load is less likely to be applied to the second pressure sensitive sensor 2E in the low load range.

In addition, in one or more embodiments described above, interdigitated comb-shaped electrodes are used as the first and second electrodes 13A to 13E and 14A to 14E of the first pressure sensitive sensors 2A to 2E, but the shape of each electrode is not limited thereto. The shape of each electrode may be a shape shown in the following third modification example.

Figure 7A:
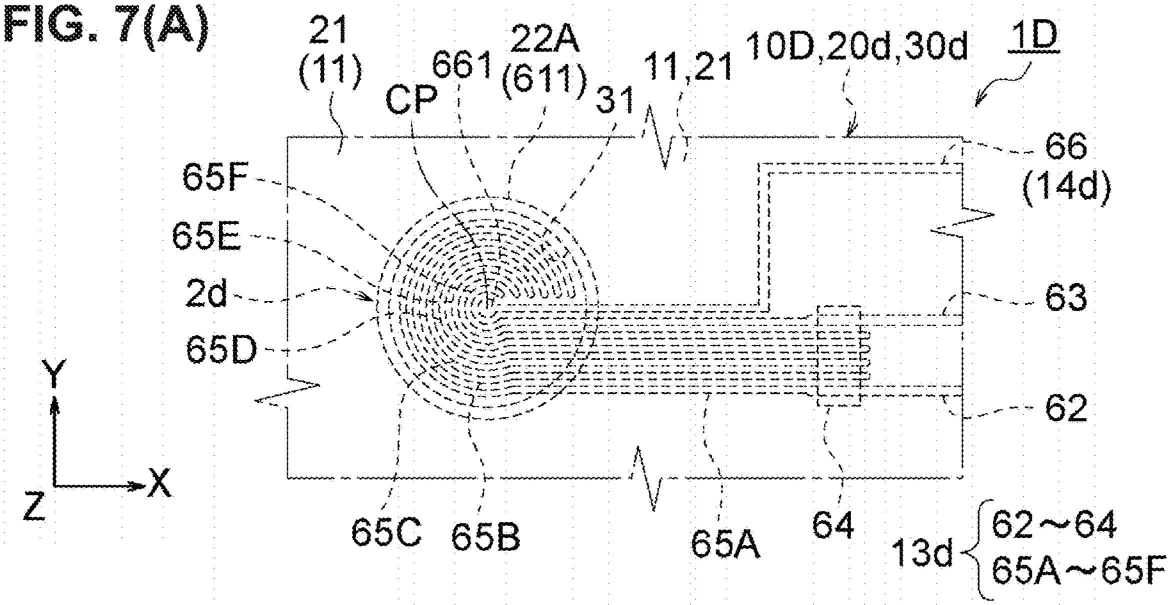
FIG. 7(A) is an enlarged plan view showing a pressure sensitive sensor according to a third modification example of the pressure sensitive sensor unit according to one or more embodiments of the invention.
Figure 7B:
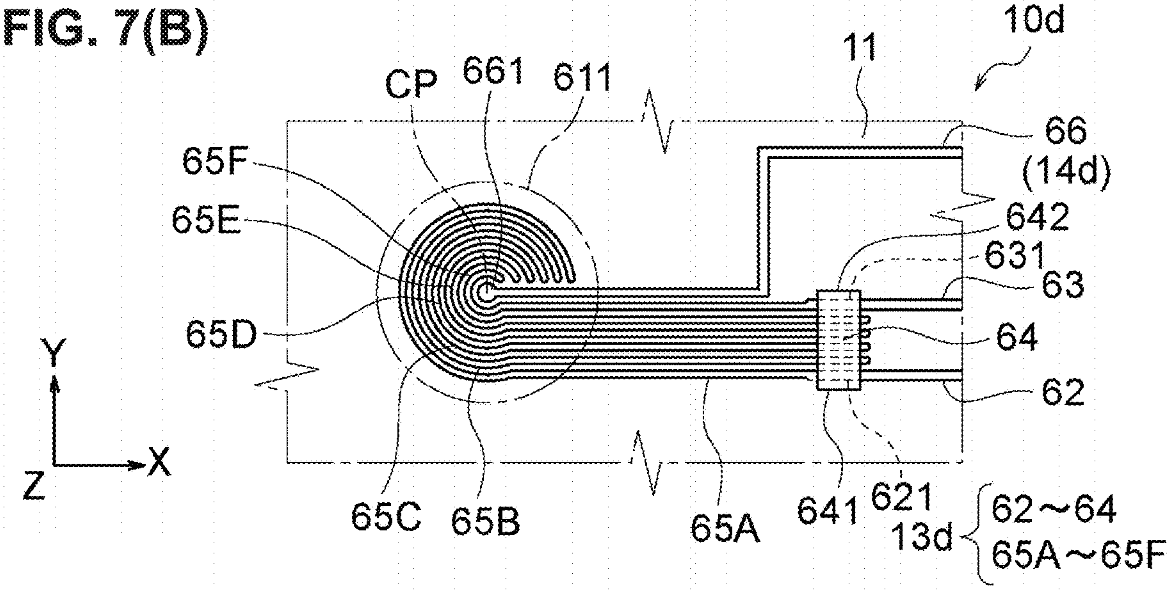
FIG. 7(B) is an enlarged plan view showing a lower membrane of the pressure sensitive sensor unit in FIG. 7(A)
Figure 7C:
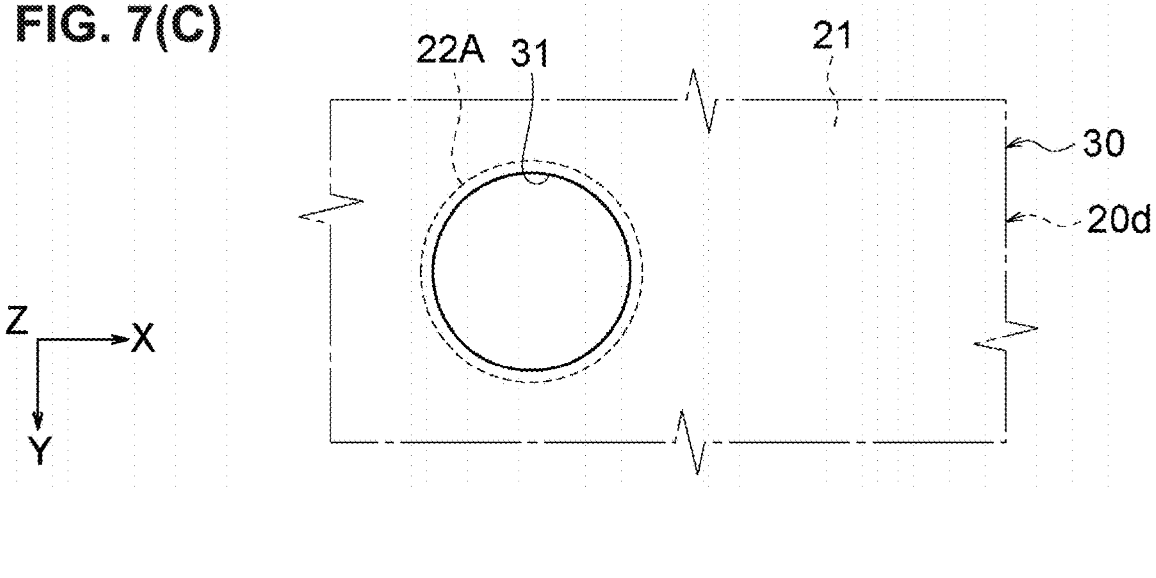
FIG. 7(C) is an enlarged plan view showing a spacer and an upper membrane of the pressure sensitive sensor unit in FIG. 7(A)

FIG. 7(A) is an enlarged plan view showing a pressure sensitive sensor according to the third modification example of the pressure sensitive sensor unit according to one or more embodiments of the invention, FIG. 7(B) is an enlarged plan view showing a lower membrane of the pressure sensitive sensor in FIG. 7(A), and FIG. 7(C) is an enlarged plan view showing an upper membrane of the pressure sensitive sensor in FIG. 7(A).

As shown in FIGS. 7(A) and 7(B), a first pressure sensitive sensor 2*d* of a pressure sensitive sensor unit 1D according to the third modification example is a pressure sensitive sensor in which a resistance value between wiring patterns 62 and 66 changes according to the applied load. A first electrode 13*d* in the third modification example has wiring patterns 62 and 63, a resistive body 64, and comb-tooth patterns 65A to 65F.

As shown in FIG. 7(B), the wiring patterns 62 and 63 are formed by printing the low-resistance conductive paste described above on the upper surface of the first base material 11 of the lower membrane substrate 10*d* and solidifying (curing) the conductive paste. In addition, instead of using the conductive paste, the wiring patterns 62 and 63 may be formed by etching a metal foil.

As shown in FIG. 7(B), the wiring pattern 62 extends linearly along the X direction in the diagram. An end portion 621 of the wiring pattern 62 is covered with the resistive body 64, and the comb-tooth pattern 65A is connected to the end portion 621. Similarly, the wiring pattern 63 also extends linearly along the X direction in the diagram. An end portion 631 of the wiring pattern 63 is covered with the resistive body 64, and the comb-tooth pattern 65F is connected to the end portion 631. Although not particularly shown, one wiring pattern 62 is connected to a power supply, whereas the other wiring pattern 63 is connected to the ground. In addition, the planar shapes of the wiring patterns 62 and 63 are not limited to the linear shapes described above so long as these are linear.

The end portion 621 of the wiring pattern 62 and the end portion 631 of the wiring pattern 63 are arranged so as to be spaced apart from each other in the Y direction in the diagram. The resistive body 64 is provided along the Y direction in the diagram, so that one end portion 641 of the resistive body 64 covers the end portion 621 of the wiring pattern 62 and the other end portion 642 of the resistive body 64 covers the end portion 631 of the wiring pattern 63. Therefore, the wiring pattern 62 on one side and the wiring pattern 63 on the other side are electrically connected to each other through the resistive body 64. The resistive body 64 is formed by printing a high-resistance conductive paste on the upper surface of the base material 11 and then curing the conductive paste.

The plurality of (six in this example) comb-tooth patterns 65A to 65F are formed by printing a low-resistance conductive paste on the first base material 11 and curing the conductive paste, similarly to the wiring patterns 62 and 63 described above. In addition, instead of using the conductive paste, the comb-tooth patterns 65A to 65F may be formed by etching a metal foil.

The comb-tooth patterns 65A to 65F are arranged substantially parallel to each other at distances therebetween in a facing region 611 of the first base material 11 facing the connection body 22A. The comb-tooth patterns 65A to 65F are aligned at distances therebetween from the inside to the outside in the facing region 611. In addition, the comb-tooth patterns 65A to 65F are arranged concentrically with respect to the center CP of a distal end portion 661 of the wiring pattern 66 in the facing region 611.

A second electrode 14*d* in the third modification example is the wiring pattern 66. The wiring pattern 66 is also formed by printing a low-resistance conductive paste on the upper surface of the base material 11 and then curing the conductive paste, similarly to the wiring patterns 62 and 63 described above. In addition, instead of using the conductive paste, the wiring pattern 66 may be formed by etching a metal foil.

As shown in FIG. 7(C), the configuration of the connection body 22A formed on the lower surface of the second base material 21 of the upper membrane substrate 20*d* is the same as that in one or more embodiments described above.

In the first pressure sensitive sensor 2*d*, when a load is applied, first, the connection body 22A comes into contact with the center CP of the distal end portion 661 of the wiring pattern 66 shown in FIG. 7(B). Then, as bending at the first opening 31 of the second base material 21 increases, the connection body 22A comes into contact with the comb-tooth pattern 65F.

When the connection body 22A is in contact with the wiring pattern 66 and the comb-tooth pattern 65F, the wiring pattern 66 detects a voltage that is almost the same potential as the ground, and a potential difference between the power supply voltage and the detected voltage of the wiring pattern 66 is output from a multimeter (not shown) or the like connected to the wiring patterns 62 and 66.

Then, as the applied load increases, the bending of the second base material 21 increases, and the connection target of the connection body 22A expands to the outer comb-tooth patterns 65E to 65A. Therefore, the distance between one end portion 641 of the resistive body 64 and the connection position of the connection target decreases, resulting in a decrease in the resistance value between the wiring patterns 62 and 66. That is, in the first pressure sensitive sensor 2*d* according to the third modification example, since the resistance length (resistance value) of the resistive body 64 changes according to the magnitude of the applied load, the voltage detected by the wiring pattern 66 changes according to the magnitude of the load.

In the third modification example, an example has been described in which the first pressure sensitive sensor 2*d* has the configuration shown in FIG. 7(A). However, the invention is not limited thereto, and the second pressure sensitive sensor may also have the configuration as shown in FIG. 7(A).

In addition, although not particularly shown, the wiring pattern 63 may not be provided and the power supply and the ground may be connected to the wiring patterns 62 and 66. Alternatively, instead of the wiring pattern 63, the wiring pattern 66 may be covered with the other end portion 642 of the resistive body 64. Even in these cases, the resistance value between the wiring patterns 62 and 66 changes according to the magnitude of the load.

In addition, in one or more embodiments described above, a case has been described in which all of the first to fourth electrodes are formed on the same base material and the first to fourth electrodes are electrically connected to each other by the connection body, but the invention is not limited thereto. As in the following fourth modification example, electrodes may be electrically connected to each other by direct contact between the electrodes.

Figure 8A:
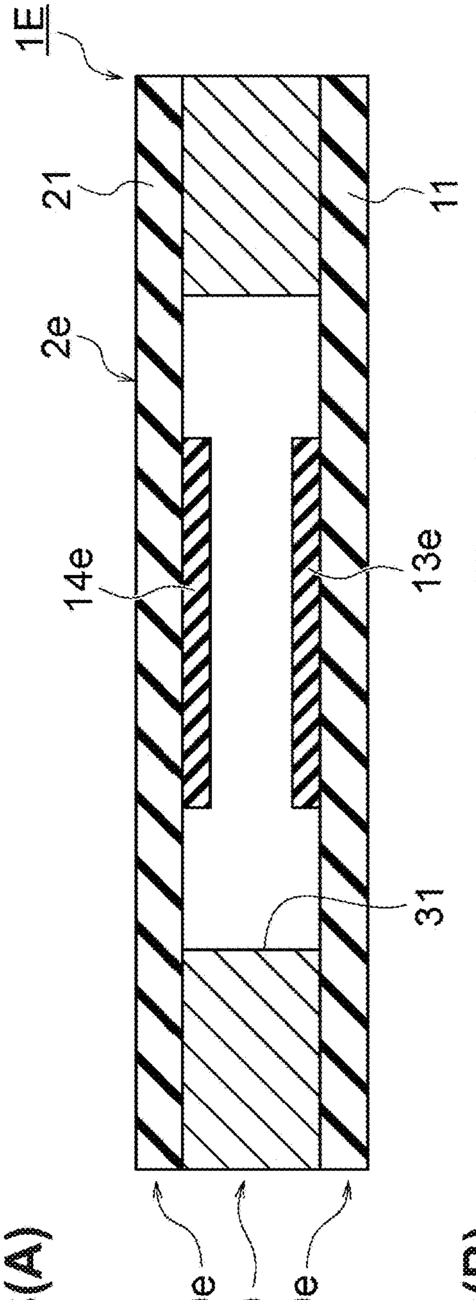
FIG. 8(A) is an enlarged plan view showing a pressure sensitive sensor according to a fourth modification example of the pressure sensitive sensor unit according to one or more embodiments of the invention.
Figure 8C:
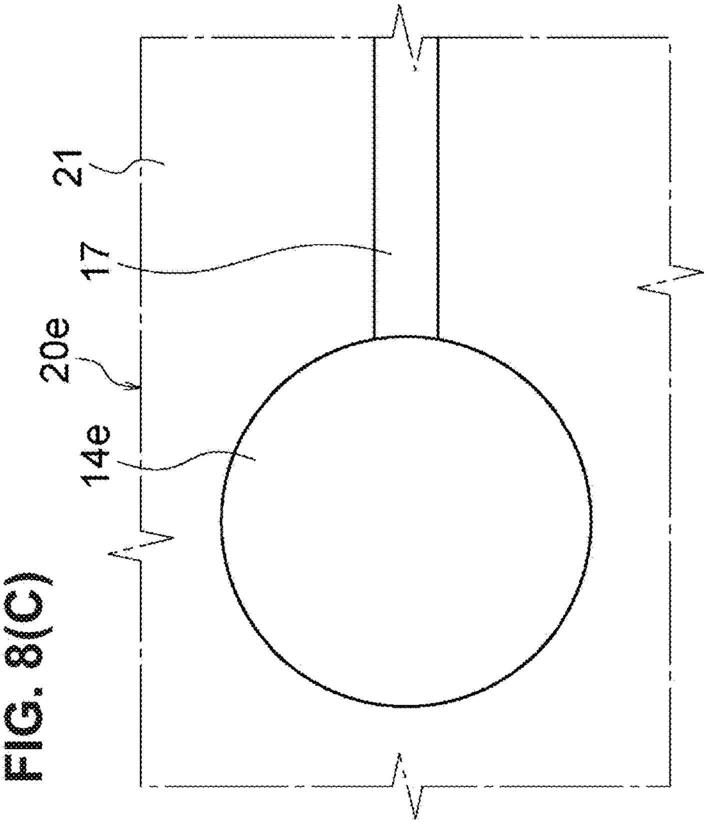
FIG. 8(C) is an enlarged plan view showing an upper membrane of the pressure sensitive sensor in FIG. 8(A).
Figure 8B:
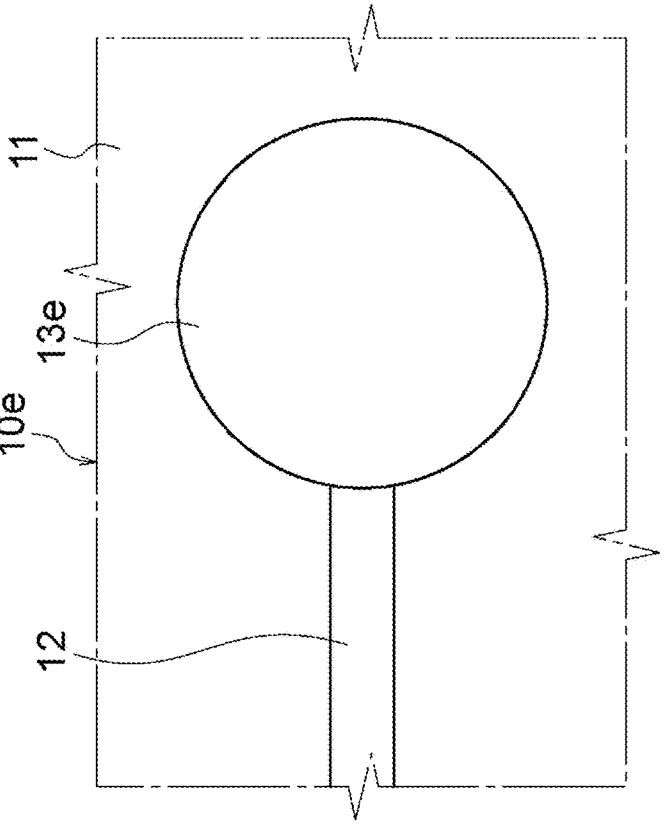
FIG. 8(B) is an enlarged plan view showing a lower membrane of the pressure sensitive sensor in FIG. 8(A)

FIG. 8(A) is an enlarged cross-sectional view showing a pressure sensitive sensor according to a fourth modification example of the pressure sensitive sensor unit according to one or more embodiments, FIG. 8(B) is an enlarged plan view showing a lower membrane of the pressure sensitive sensor in FIG. 8(A), and FIG. 8(C) is an enlarged plan view showing an upper membrane of the pressure sensitive sensor in FIG. 8(A).

As shown in FIGS. 8(A) to 8(C), a first pressure sensitive sensor 2*e* of a pressure sensitive sensor unit 1E according to the fourth modification example includes a disk-shaped first electrode 13*e* formed on the upper surface of a first base material 11 of a lower membrane substrate 10*e* and a disk-shaped second electrode 14*e* formed on the lower surface of a second base material 21 of an upper membrane substrate 20*e*.

The first electrode 13*e* and the second electrode 14*e* face each other at the first opening 31 of the spacer 30. The first and second electrodes 13*e* and 14*e* can be formed by printing and curing a pressure sensitive ink, for example. An example of the pressure sensitive ink is a quantum tunnel composite material using the quantum tunneling effect. In addition, other specific examples of the pressure sensitive ink include one containing conductive particles such as metal or carbon, elastic particles such as organic elastic filler or inorganic oxide filler, and a binder. The surface of the pressure sensitive ink is made uneven by the elastic particles. In addition, the first and second electrodes 13*e* and 14*e* may be formed by plating or patterning.

When a load is applied to the first pressure sensitive sensor 2*e*, the second base material 21 bends downward at the first opening 31, causing the first electrode 13*e* and the second electrode 14_e_ to come into contact with each other and become electrically connected to each other.

In the fourth modification example, an example has been described in which the first pressure sensitive sensor 2_e_ has the configuration shown in FIG. 8(A). However, the invention is not limited thereto, and the second pressure sensitive sensor may also have the configuration shown in FIG. 8(A).

In addition, the embodiments described above is described to facilitate the understanding of the invention, and is not described to limit the invention. Therefore, each element disclosed in the above-described embodiments is intended to include all design changes or equivalents falling within the technical scope of the invention. Accordingly, the scope of the invention should be limited only by the attached claims.

Explanations of Letters or Numerals

1A to 1E PRESSURE SENSITIVE SENSOR UNITS
2 PRESSURE SENSITIVE SENSOR SHEET
2A to 2D, 2_d_, 2_e_ FIRST PRESSURE SENSITIVE SENSORS
2E SECOND PRESSURE SENSITIVE SENSOR
10, 10_d_, 10_e_ LOWER MEMBRANE SUBSTRATES
11 BASE MATERIAL
12 FIRST WIRING PATTERN
121_a_, 121_b_ FIRST AND SECOND WIRING PORTIONS
122 FIRST EXTERNAL TERMINAL PORTION
13 FIRST ELECTRODE GROUP
13A to 13D, 13_d_, 13_e_ FIRST ELECTRODES
14 SECOND ELECTRODE GROUP
14A to 14D, 14_d_, 14_e_ SECOND ELECTRODES
13E THIRD ELECTRODE
14E FOURTH ELECTRODE
131, 141 CONNECTION WIRING PORTION
132, 142 COMB-TOOTH PORTION
135A to 135D FIRST DETECTION UNITS
135E SECOND DETECTION UNIT
15 SECOND WIRING PATTERN
151 THIRD WIRING PORTION
153 FIRST RESISTIVE BODY CONNECTION PORTION
16 RESISTIVE BODY
17 THIRD WIRING PATTERN
171_a_, 171_b_ FOURTH AND FIFTH WIRING PORTIONS
172 SECOND EXTERNAL TERMINAL PORTION
173 SECOND RESISTIVE BODY CONNECTION PORTION
62 WIRING PATTERN
621 END PORTION
63 WIRING PATTERN
631 END PORTION
64 RESISTIVE BODY
641, 642 END PORTION
65A to 65F COMB-TOOTH PATTERNS
655 DETECTION UNIT
66 WIRING PATTERN
661 DISTAL END PORTION
20, 20_e_ UPPER MEMBRANE SUBSTRATE
21 BASE MATERIAL
22A to 22E CONNECTION BODIES
30 SPACER
31 FIRST OPENING
32 SECOND OPENING
3A to 3D FIRST LOAD TRANSMITTING MEMBERS
4, 4_b_ SECOND LOAD TRANSMITTING MEMBER
5 PLATE MEMBER

The invention claimed is:

1. A pressure sensitive sensor unit, comprising:
a first pressure sensitive sensor with a first output that changes according to a magnitude of an applied load;
a second pressure sensitive sensor with a second output that changes according to the magnitude of the applied load;
a plate member arranged so as to include the first and second pressure sensitive sensors in a plan view;
a first load transmitting member interposed between the first pressure sensitive sensor and the plate member; and
a second load transmitting member interposed between the second pressure sensitive sensor and the plate member, wherein
the first load transmitting member transmits a load belonging to a first load range to the first pressure sensitive sensor,
the second load transmitting member transmits a load belonging to a second load range to the second pressure sensitive sensor,
the second load range is larger than the first load range,
the first pressure sensitive sensor includes first and second electrodes electrically connected to each other by application of the load belonging to the first load range,
the second pressure sensitive sensor includes third and fourth electrodes electrically connected to each other by application of the load belonging to the second load range,
the pressure sensitive sensor unit includes a resistive body electrically connected in series to the first or second electrode of the first pressure sensitive sensor, and
a resistance value of the resistive body is larger than a resistance value of the second pressure sensitive sensor in an ON state.

2. The pressure sensitive sensor unit according to claim 1, wherein
a height of the first load transmitting member is greater than a height of the second load transmitting member, or
the second load transmitting member is softer than the first load transmitting member.

3. The pressure sensitive sensor unit according to claim 1, wherein
the pressure sensitive sensor unit includes a plurality of the first pressure sensitive sensors,
the pressure sensitive sensor unit includes:
a first electrode group including a plurality of the first electrodes electrically connected to each other; and
a second electrode group including a plurality of the second electrodes electrically connected to each other, and
the resistive body is electrically connected in series to the first or second electrode group.

4. The pressure sensitive sensor unit according to claim 1, wherein
the pressure sensitive sensor unit includes:
a plurality of the first pressure sensitive sensors; and
a plurality of the first load transmitting members,
the plurality of first pressure sensitive sensors are arranged around the second pressure sensitive sensor, and
the plurality of first load transmitting members are arranged around the second load transmitting member.

5. A pressure sensitive sensor unit, comprising:
a first pressure sensitive sensor with a first output that changes according to a magnitude of an applied load;

a second pressure sensitive sensor with a second output that changes according to the magnitude of the applied load;

a plate member arranged so as to include the first and second pressure sensitive sensors in a plan view;

a first load transmitting member interposed between the first pressure sensitive sensor and the plate member; and a second load transmitting member interposed between the second pressure sensitive sensor and the plate member, wherein the first load transmitting member transmits a load belonging to a first load range to the first pressure sensitive sensor, the second load transmitting member transmits a load belonging to a second load range to the second pressure sensitive sensor, the second load range is larger than the first load range, the first pressure sensitive sensor includes first and second electrodes electrically connected to each other by application of the load belonging to the first load range, the second pressure sensitive sensor includes third and fourth electrodes electrically connected to each other by application of the load belonging to the second load range, the pressure sensitive sensor unit includes a resistive body electrically connected in series to the first or second electrode of the first pressure sensitive sensor, the pressure sensitive sensor unit includes:

a first base material; and a second base material facing the first base material, the first electrode is provided on the first base material, and the second electrode is provided:

on the first base material so as to face a first connection body, where the first connection body is provided on the second base material so as to face the first electrode; or on the second base material so as to face the first electrode.

6. The pressure sensitive sensor unit according to claim 5, wherein a height of the first load transmitting member is greater than a height of the second load transmitting member, the first load transmitting member is:

bonded to at least one of the first and second base materials; and bonded to the plate member, and the second load transmitting member is bonded to only one of the first base material, the second base material, and the plate member.

7. The pressure sensitive sensor unit according to claim 5, wherein the pressure sensitive sensor unit includes a spacer interposed between the first base material and the second base material, the spacer includes:

a first opening in which the first and second electrodes of the first pressure sensitive sensor are housed; and a second opening in which the third and fourth electrodes of the second pressure sensitive sensor are housed, and a width of the first opening is larger than a width of the second opening.

8. The pressure sensitive sensor unit according to claim 5, wherein a height of the first load transmitting member is greater than a height of the second load transmitting member, or the second load transmitting member is softer than the first load transmitting member.

9. The pressure sensitive sensor unit according to claim 5, wherein the pressure sensitive sensor unit includes a plurality of the first pressure sensitive sensors, the pressure sensitive sensor unit includes:

a first electrode group including a plurality of the first electrodes electrically connected to each other; and a second electrode group including a plurality of the second electrodes electrically connected to each other, and the resistive body is electrically connected in series to the first or second electrode group.

10. The pressure sensitive sensor unit according to claim 5, wherein the pressure sensitive sensor unit includes:

a plurality of the first pressure sensitive sensors; and a plurality of the first load transmitting members, the plurality of first pressure sensitive sensors are arranged around the second pressure sensitive sensor, and the plurality of first load transmitting members are arranged around the second load transmitting member.

11. A pressure sensitive sensor unit, comprising:

a first pressure sensitive sensor with a first output that changes according to a magnitude of an applied load;

a second pressure sensitive sensor with a second output that changes according to the magnitude of the applied load;

a plate member arranged so as to include the first and second pressure sensitive sensors in a plan view;

a first load transmitting member interposed between the first pressure sensitive sensor and the plate member; and a second load transmitting member interposed between the second pressure sensitive sensor and the plate member, wherein the first load transmitting member transmits a load belonging to a first load range to the first pressure sensitive sensor, the second load transmitting member transmits a load belonging to a second load range to the second pressure sensitive sensor, the second load range is larger than the first load range, the first pressure sensitive sensor includes first and second electrodes electrically connected to each other by application of the load belonging to the first load range, the second pressure sensitive sensor includes third and fourth electrodes electrically connected to each other by application of the load belonging to the second load range, the pressure sensitive sensor unit includes a resistive body electrically connected in series to the first or second electrode of the first pressure sensitive sensor, the pressure sensitive sensor unit includes:

a first base material; and a second base material facing the first base material, the third electrode is provided on the first base material, and the fourth electrode is provided:

on the first base material so as to face a second connection body, where the second connection body is provided on the second base material so as to face the third electrode; or on the second base material so as to face the third electrode.

12. The pressure sensitive sensor unit according to claim 11, wherein a height of the first load transmitting member is greater than a height of the second load transmitting member, or the second load transmitting member is softer than the first load transmitting member.

13. The pressure sensitive sensor unit according to claim 11, wherein the pressure sensitive sensor unit includes a plurality of the first pressure sensitive sensors, the pressure sensitive sensor unit includes:

a first electrode group including a plurality of the first electrodes electrically connected to each other; and a second electrode group including a plurality of the second electrodes electrically connected to each other, and the resistive body is electrically connected in series to the first or second electrode group.

14. The pressure sensitive sensor unit according to claim 11, wherein the pressure sensitive sensor unit includes:

a plurality of the first pressure sensitive sensors; and a plurality of the first load transmitting members, the plurality of first pressure sensitive sensors are arranged around the second pressure sensitive sensor, and the plurality of first load transmitting members are arranged around the second load transmitting member.

* * * * *